United States Patent
Arai

(10) Patent No.: US 9,195,313 B2
(45) Date of Patent: Nov. 24, 2015

(54) INFORMATION PROCESSING APPARATUS CAPABLE OF RECOGNIZING USER OPERATION AND METHOD FOR CONTROLLING THE SAME

(71) Applicant: CANON KABUSHIKI KAISHA, Tokyo (JP)

(72) Inventor: Tsunekazu Arai, Tama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/295,109

(22) Filed: Jun. 3, 2014

(65) Prior Publication Data
US 2014/0361985 A1      Dec. 11, 2014

(30) Foreign Application Priority Data
Jun. 5, 2013   (JP) .................. 2013-118875

(51) Int. Cl.
G06F 3/01       (2006.01)
G06K 9/00      (2006.01)
G06F 3/03       (2006.01)
G06F 3/042     (2006.01)
G06F 3/0483   (2013.01)
G06F 3/0488   (2013.01)

(52) U.S. Cl.
CPC .............. *G06F 3/017* (2013.01); *G06F 3/0304* (2013.01); *G06F 3/0425* (2013.01); *G06F 3/0483* (2013.01); *G06F 3/04883* (2013.01); *G06K 9/00355* (2013.01)

(58) Field of Classification Search
CPC ............. G06F 1/00; G06F 3/017; G06F 3/01; G06F 3/0481; G06F 3/041
See application file for complete search history.

(56) References Cited

U.S. PATENT DOCUMENTS

2010/0044121 A1*   2/2010  Simon et al. ............... 178/18.03

FOREIGN PATENT DOCUMENTS

JP         2003-216955 A     7/2003

* cited by examiner

*Primary Examiner* — Michael Faragalla
(74) *Attorney, Agent, or Firm* — Canon USA, Inc. IP Division

(57) ABSTRACT

An information processing apparatus according to the present invention can improve the operability when a user performs a gesture operation relating to a target object.

14 Claims, 13 Drawing Sheets

FIG.2A

| IDENTIFIED TARGET OBJECT 200 | MOVEMENT OF HAND 201 | INSTRUCTION CONTENT 202 | OPERATION NAME 203 | GESTURE 204 |
|---|---|---|---|---|
| PAPER | MOVE/ROTATE PAPER PLACED ON HAND | RESET RECOGNITION AREA | PAPER MOVING | |
| PAPER | REVERSE PAPER | PERFORM READING PROCESSING AFTER COMPLETING REVERSING OPERATION | REVERSING | ○ |
| BOOK | TURN PAGE | PERFORM READING PROCESSING AFTER COMPLETING TURNING OPERATION | PAGE TURNING | ○ |
| BOOK | MOVE/ROTATE GRIPPED BOOK | RESET RECOGNITION AREA | BOOK MOVING | |
| IMAGE DATA | MOVE IN LEFT DIRECTION | DISPLAY NEXT IMAGE DATA | LEFT SWIPING | ○ |
| IMAGE DATA | MOVE IN RIGHT DIRECTION | DISPLAY PREVIOUS IMAGE DATA | RIGHT SWIPING | ○ |
| IMAGE DATA | MOVE TOUCHED IMAGE DATA | DISPLAY PREVIOUS IMAGE DATA | DRAGGING | |
| IMAGE DATA | PINCH OR ROTATE IMAGE DATA TOUCHED AT TWO PLACES | ENLARGE/ REDUCE/ROTATE IMAGE DATA | IMAGE MODIFYING | |

FIG.2B

| IDENTIFIED TARGET OBJECT 210 | HAND POSITION IN RELATION TO TARGET OBJECT 211 | STATE OF HAND 212 | NAME OF ESTIMATED OPERATION 213 | RECOGNITION AREA 214 |
|---|---|---|---|---|
| PAPER/ BOOK | ON TARGET OBJECT | PRESSING FROM ABOVE | PAPER MOVING | (RECOGNITION IS STOPPED UNTIL MOVEMENT IS COMPLETED) UPDATED ACCORDING TO POSITION AND DIRECTION OF TARGET OBJECT AT MOVEMENT COMPLETED POSITION |
| PAPER | ADJACENT TO CONTOUR OF TARGET OBJECT | GRIPPING TARGET OBJECT | REVERSING | PREDETERMINED MARGINAL AREA IS ADDED |
| BOOK | ADJACENT TO CONTOUR OF TARGET OBJECT | GRIPPING TARGET OBJECT | PAGE TURNING | UPDATED CONSIDERING SIZE COMPARABLE TO SPREAD PAGE |
| BOOK | TWO PLACES SANDWICHING TARGET OBJECT | LIFTING TARGET OBJECT | BOOK MOVING | (RECOGNITION IS STOPPED UNTIL MOVEMENT IS COMPLETED) UPDATED ACCORDING TO POSITION AND DIRECTION OF TARGET OBJECT AT MOVEMENT COMPLETED POSITION |
| IMAGE DATA | ON TARGET OBJECT | TOUCHING OPERATION PLANE | DRAGGING | (RECOGNITION IS STOPPED UNTIL MOVEMENT IS COMPLETED) UPDATED ACCORDING POSITION AND DIRECTION OF MOVEMENT COMPLETED TARGET OBJECT |
| IMAGE DATA | ON TARGET OBJECT | TOUCHING TWO PLACES ON OPERATION PLANE | IMAGE MODIFYING | SET TO MAXIMUM SIZE WHEN TWO-POINT TOUCH IS RECOGNIZED AND UPDATE ACCORDING TO SIZE AND DIRECTION OF OPERATION COMPLETED IMAGE DATA AFTER TOUCH IS RELEASED |

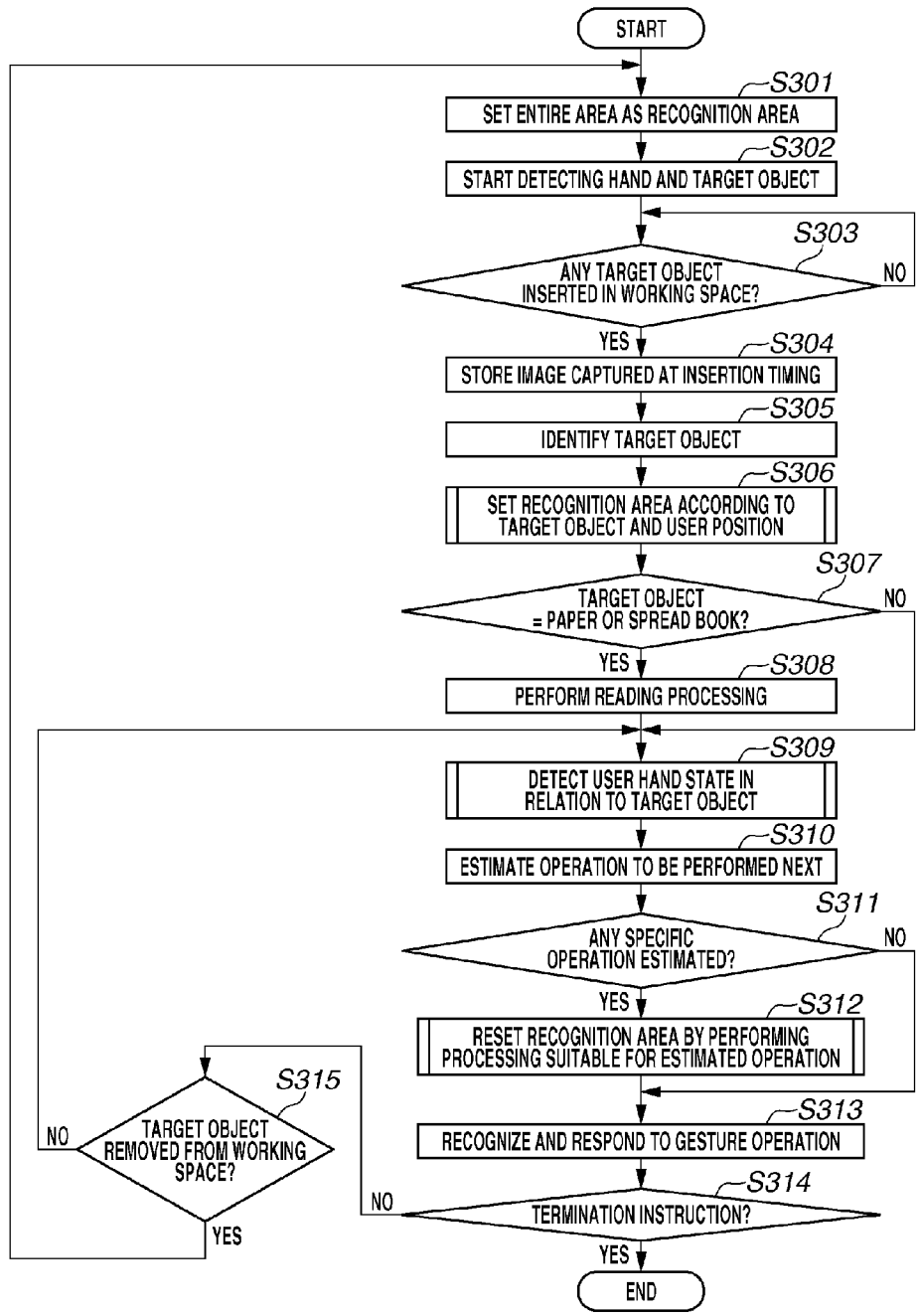

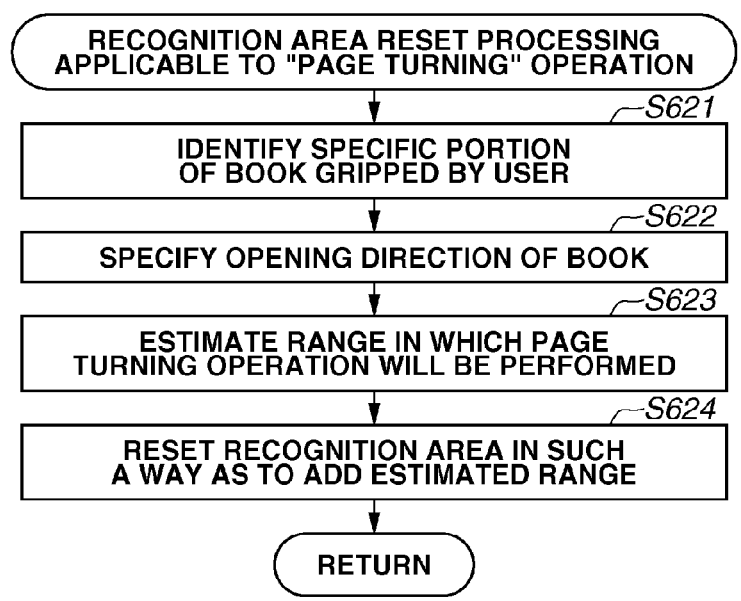
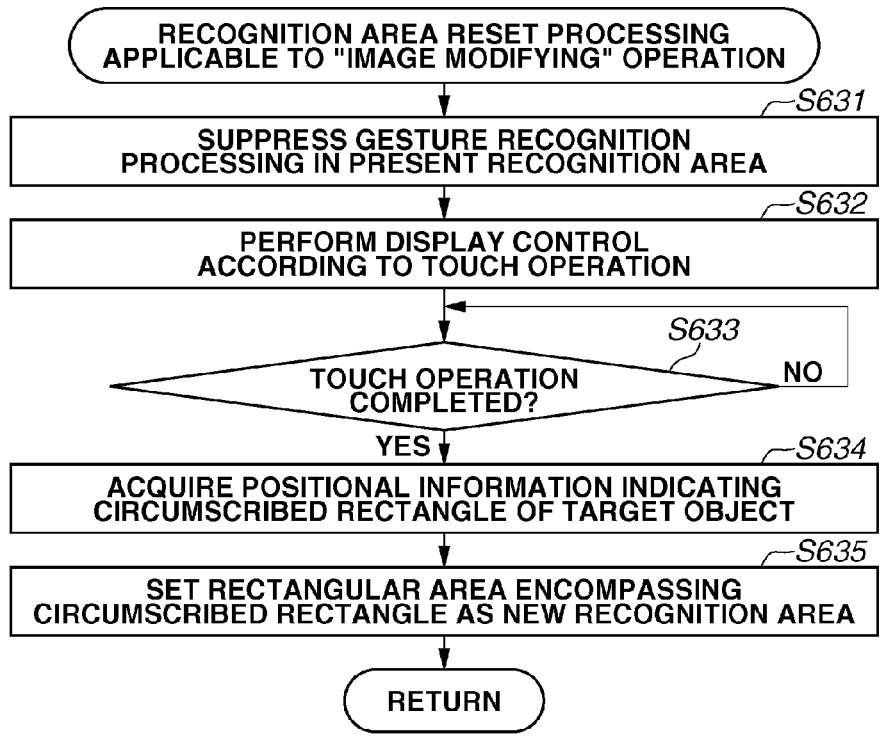

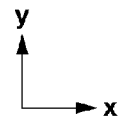

INFORMATION PROCESSING APPARATUS CAPABLE OF RECOGNIZING USER OPERATION AND METHOD FOR CONTROLLING THE SAME

BACKGROUND

1. Technical Field

The present disclosure relates to an information processing apparatus that can recognize a user operation.

2. Description of the Related Art

A conventional apparatus can detect a hand area that includes a user's hand from an image captured by a visible light camera or an infrared ray camera and can recognize a gesture operation based on the movement and the position of the detected hand. The above-mentioned conventional apparatus can recognize a gesture operation performed against the apparatus and identify an instruction content based on a comparison between a user's hand movement that can be recognized by chasing the hand area and various gesture patterns registered beforehand in association with respective instruction contents. To identify a portion to be compared with a gesture pattern, in the hand movement that occurs in the angle of view of the visible light camera or the infrared ray camera, it is general to start chasing the hand area (start recognizing the gesture operation) when the hand enters a specific area.

As discussed in Japanese Patent Application Laid-Open No. 2003-216955, when a user performs a gesture operation, it is conventionally known to set a specific area to be used to recognize the gesture operation in the vicinity of a region where a hand is possibly present, based on at least one of a horizontal width, a vertical length, and an area of a human face portion extracted from a moving image. The specific area to be set to recognize a gesture is referred to as a gesture recognition area.

The gesture recognition area is required to be sufficiently large to accommodate all of hand movements sequentially occurring during the gesture operation. On the other hand, if the gesture recognition area is excessively large, the user is required to perform an exaggerated action to remove the hand from the gesture recognition area before starting the next gesture operation.

In particular, when the user performs a gesture operation that relates to a target object (e.g., a virtual object or a physical object), the size of the range in which the user moves the hand tends to be influenced by the size of the target object. Accordingly, the user's exaggerated action to be performed to return to an initial state may be recognized as an unnatural movement. The operability decreases significantly.

According to the technique discussed in Japanese Patent Application Laid-Open No. 2003-216955, at the present position of the user, it is feasible to set a gesture extraction area that is comparable to an area in which each user's hand is possibly present. However, the size of an area that is suitable for each gesture operation to be performed is not taken into consideration.

SUMMARY

According to an aspect of the present invention, an information processing apparatus can recognize a gesture operation performed by a gesture object based on an image obtained by an imaging unit that captures an image of a predetermined area. The information processing apparatus includes an acquisition unit configured to acquire positional information about a target object that is present in the predetermined area, and a setting unit configured to set a partial area of the predetermined area, which corresponds to the positional information about the target object acquired by the acquisition unit, as a gesture recognition area of at least one gesture operation that corresponds to the target object. The information processing apparatus further includes a recognition unit configured to recognize the gesture operation performed by the gesture object based on a partial portion of the image obtained by the imaging unit, which corresponds to the gesture recognition area set by the setting unit.

Further features of the present invention will become apparent from the following description of exemplary embodiments with reference to the attached drawings.

BRIEF DESCRIPTION OF THE DRAWINGS

FIGS. 2A and 2B are tables illustrating examples of gesture operations that can be recognized by the information processing apparatus, in addition to relevant information.

FIG. 3 is a flowchart illustrating an example flow of main processing in which the information processing apparatus recognizes a gesture operation.

FIGS. 6A to 6D are flowcharts each illustrating an example flow of processing that can be performed to set a recognition area that is appropriate for each estimated operation.

DESCRIPTION OF THE EMBODIMENTS

Various exemplary embodiments, features, and aspects of the invention will be described in detail below with reference to the drawings.

Constituent components described in the following exemplary embodiments are mere examples. The scope of the present invention should not be limited to these examples.

In a first exemplary embodiment, an area in which a gesture operation is extracted is not fixed and is set to have a size that is comparable to each gesture operation that may occur occasionally.

Further, the processing to be performed in the first exemplary embodiment includes estimating an operation that a user wants to perform beforehand in recognizing a gesture operation relating to a target object. Then, the processing to be performed in the first exemplary embodiment includes setting a gesture recognition area that is suitable in both size and position for a gesture operation that will be possibly performed next in relation to the target object (i.e., an estimated gesture operation). Hereinafter, the above-mentioned processing will be described in detail below.

In the following description, the gesture recognition area is an area to be used to determine that a gesture operation has been started from start time of detecting an object (e.g., user's hand), which can be used in the gesture operation, in the gesture recognition area. In the following description, the object that can be used for a gesture operation is referred to as a gesture object. Further, the processing to be performed in the first exemplary embodiment includes determining that the gesture operation has been completed when the gesture object exits from the gesture recognition area. Further, the processing to be performed in the first exemplary embodiment includes recognizing a gesture operation, if a sequential movement of the gesture object, from a start time of the gesture operation to an end time of the gesture operation, is a predetermined movement that has been stored beforehand.

More specifically, an information processing apparatus according to the present exemplary embodiment tracks the movement of the gesture object in the gesture recognition area and, recognizes that a gesture operation associated with a predetermined movement has been input if the tracked movement is the same as the predetermined movement. In the following description, the gesture recognition area may be simply referred to as the recognition area. In the present exemplary embodiment, the user's hand is an example that is usable as the gesture object. A stylus or any other tool is usable similarly.

Figure 1A:
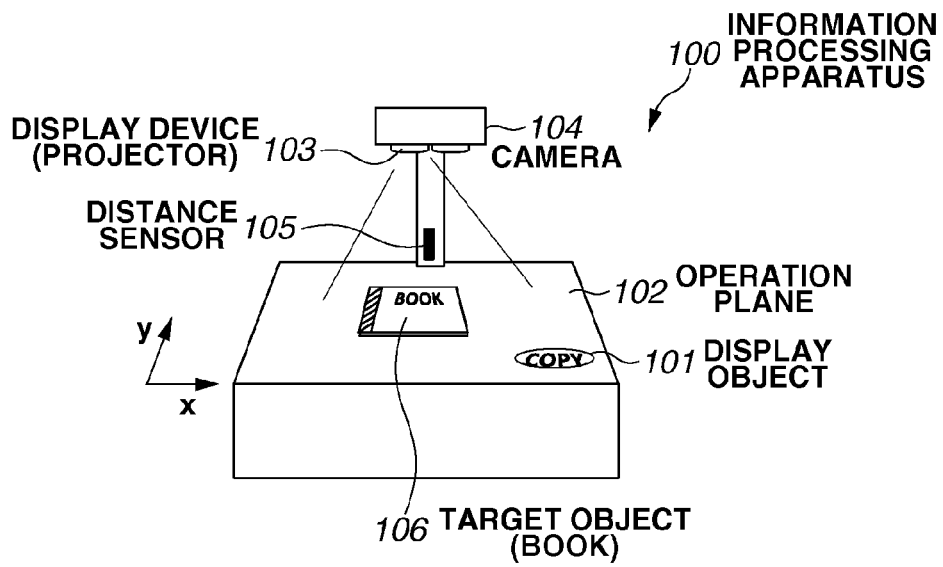
FIGS. 1A, 1B, and 1C illustrate examples of hardware and software configurations of an information processing apparatus and an appearance thereof.

FIG. 1A illustrates an example of the appearance of an information processing apparatus 100 according to the present exemplary embodiment. In the present exemplary embodiment, the information processing apparatus 100 can display a projection image that includes a display object 101 (e.g., a button or an icon) dedicated to a user interface that enables a user to touch to perform an input operation with a projector 103 placed above an operation plane 102.

Further, the information processing apparatus 100 includes a camera 104 placed above the operation plane 102. Accordingly, the information processing apparatus 100 can recognize a user operation based on an overhead view of a video captured by the camera 104. Further, the information processing apparatus 100 can capture an image of a target object 106, for example, a background object, placed on the operation plane 102 to obtain image data.

An example of the target object illustrated in FIG. 1A includes a book 106 placed on the operation plane 102. In the following description, an image capturing operation to be performed by the camera 104 to obtain image data that represents the content of the target object, for example, a physical object such as a paper or a book, is referred to as "reading." Further, the information processing apparatus 100 includes a distance sensor 105 that can detect a distance between the gesture object and the operation plane 102.

If the gesture object can be detected within a predetermined distance from a surface of the operation plane 102, the information processing apparatus 100 determines that the operation plane 102 is currently touched. In the present exemplary embodiment, the position of the target object or the user's hand can be defined in relation to the operation plane 102 using a coordinate system illustrated in FIG. 1A. The coordinate system has an origin with an x axis and a y axis perpendicular to each other and respectively extend from the origin as shown in FIG. 1A.

In the present exemplary embodiment, the information processing apparatus 100 can recognize a user's gesture operation based on an image captured by the camera 104. In particular, the information processing apparatus 100 can recognize a user operation as a gesture operation if the user operation is performed against the target object placed on the operation plane 102.

For example, if the user turns a page of the book 106, the information processing apparatus 100 recognizes a hand movement of the user as a gesture operation that instructs reading each spread page. If the information processing apparatus 100 recognizes the termination of the user's turning movement as an operation termination, the information processing apparatus 100 performs reading processing to obtain image data of the turned spread page.

In the present exemplary embodiment, the projector 103 can project or display an image based on the image data having been read as mentioned above on the operation plane 102. The projector 103 may also project the image together with a thumbnail image thereof on the operation plane 102. If the image projected on the operation plane 102 is the target object, the information processing apparatus 100 recognizes a hand movement occurring in the left direction or the right direction (i.e., a swiping gesture) on the displayed image as a gesture operation that instructs forwarding the image.

The information processing apparatus 100 changes image to be displayed successively after each gesture operation has been recognized. In the following description, a gesture operation performed against a physical object (e.g., a book) or a virtual object (e.g., displayed image data) as mentioned above is referred to as a gesture operation relating to the target object. In the present exemplary embodiment, the "book" includes a plurality of papers that constitute a plurality of pages. When a closed page of the "book" is turned, the content of the turned page can be viewed or read.

Figure 1B:
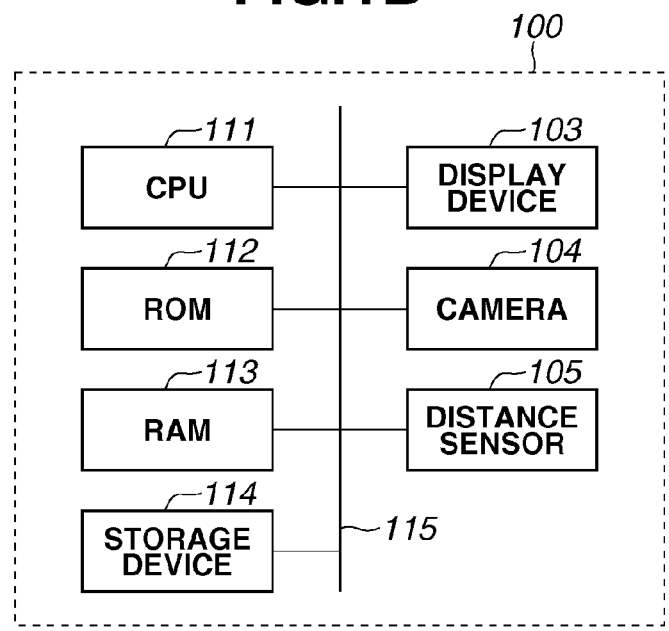

FIG. 1B illustrates a hardware configuration of the information processing apparatus 100 according to the present exemplary embodiment. In FIG. 1B, a central processing unit (CPU) 111 can execute a control program of the information processing apparatus 100 to perform calculation processing and logical determinations in such a way as to realize various types of processing. The CPU 111 can control each constituent component connected to a system bus 115 in the information processing apparatus 100.

A read only memory (ROM) 112 is a program memory that stores programs relating to various controls to be performed by the CPU 111. The programs stored in the ROM 112 include processing procedures illustrated in the following flowcharts. A random access memory (RAM) 113 is usable as a work area for the CPU 111, a data save area in case of error processing, and a load area into which the above-mentioned control program can be loaded.

A storage device 114 includes a hard disk drive that can store data and programs relating to the present exemplary embodiment or an external storage device connected to the information processing apparatus 100. The display apparatus 103 includes, for example, a display device or a projector that can display electronic data that represent display objects and images. In the present exemplary embodiment, the display apparatus 103 includes a liquid crystal projector.

In the present exemplary embodiment, the camera 104 is placed above the operation area in such a way as to capture a plan view image. The camera 104 is an imaging unit that is configured to capture an image of an object or an input image. The distance sensor 105 includes, for example, an infrared ray sensor. The distance sensor 105 can detect a user's touch operation, if it is performed on the operation plane 102, based on the distance between the gesture object (e.g., user's hand) that the user uses in the operation and the operation plane 102.

The information processing apparatus 100 according to the present exemplary embodiment includes the display apparatus 103 and the camera 104 as built-in apparatuses. Alternatively, the display apparatus 103 and the camera 104 can be externally connected devices that can be controlled by the CPU 111.

Figure 1C:
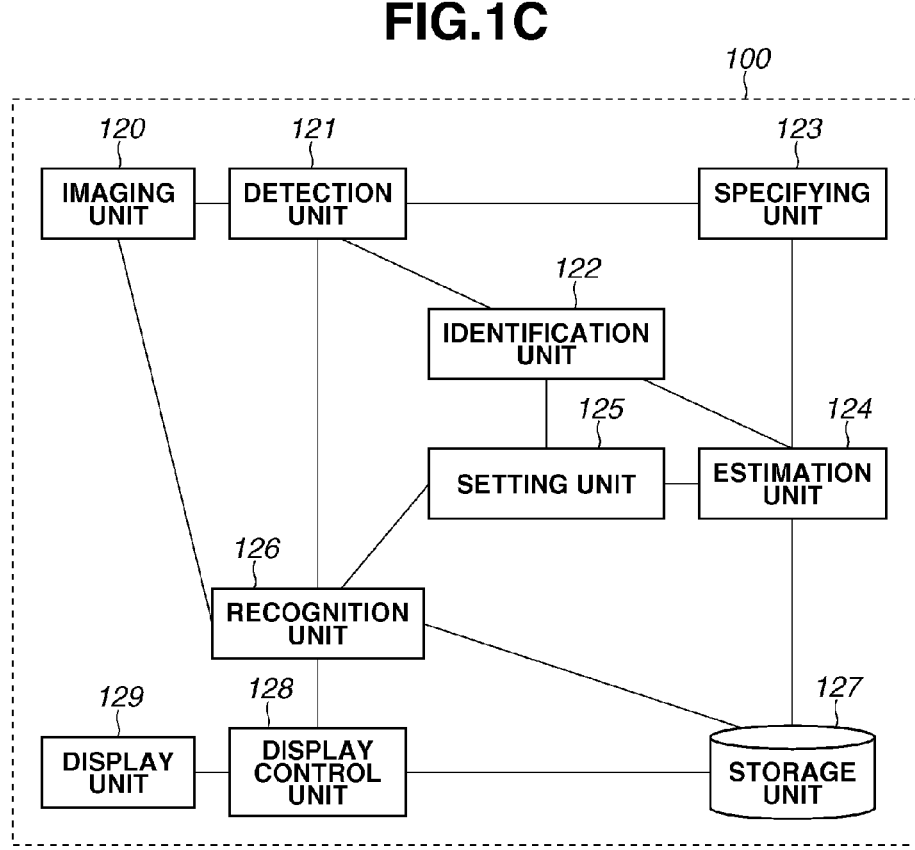

FIG. 1C is a block diagram illustrating a functional configuration of the information processing apparatus 100 according to the first exemplary embodiment. For example, when the above-mentioned software processing to be performed by the CPU 111 is replaced by a hardware configuration, it is useful to provide calculation units and circuits that correspond to the above-mentioned functions (i.e., processing units).

An imaging unit 120 includes the camera 104 and the CPU 111. The imaging unit 120 is positioned above the operation plane 102 and can acquire an image of a predetermined area (i.e., an imaging area) of the operation plane 102. Further, the imaging unit 120 can read a target object that is a physical object (e.g., a paper or a book) placed on the operation plane 102. The space that can be imaged by the imaging unit 120 (i.e., the space extending from a lens of the camera 104 to the operation plane 102) is referred to as a working space in the following description. A two-dimensional range that can be on the camera 104, when an image of the working space is captured by the camera 104, is referred to as an imaging area.

The imaging unit 120 is continuously operable to periodically capture an image of the working space. Detecting a movement of an imaging target is feasible by comparing a plurality of images that are sequentially captured. In the present exemplary embodiment, the imaging unit 120 performs an image capturing operation dedicated to the reading processing independently of an image capturing operation that is periodically performed.

However, one of a plurality of images obtained through periodical image capturing operations can be used as an image dedicated to the reading processing. Further, it is useful to acquire an image dedicated to the reading processing based on a plurality of images obtained through a plurality of image capturing operations. A range that can be imaged by the camera 104 is referred to as a reading area. However, in the present exemplary embodiment, it is presumed that the size of the operation plane 102 is substantially equal to the size of the reading area.

A detection unit 121 includes the CPU 111, which can execute a program and process data loaded into the RAM 113 from the ROM 112. The detection unit 121 can detect a detection target present in the working space based on an image captured by the imaging unit 120. The detection target in the present exemplary embodiment includes a user's hand, a physical object that is a target to be processed in object reading processing, or a displayed virtual object. However, when the image data projected as a target object is a virtual object, it is unnecessary to detect a captured image.

For example, the processing for acquiring projection image data from the display control unit 128 or the processing for acquiring flag information that indicates whether the projection image includes a virtual object that can be a gesture operation target can be replaced by the detection based on the captured image. In the present exemplary embodiment, the detection unit 121 performs target detection processing according to a background difference method that uses an image captured by the imaging unit 120 and an initial image captured beforehand in an initial state (i.e., the working space in which the detection target is not present). The detection unit 121 can detect a partial area of the input image that includes a moving object having appeared in the working space based on a difference between the initial image that serves as a background and an input image captured by the imaging unit 120.

Further, the detection unit 121 can detect whether at least a part of the moving object included in the detected area is stationary based on a difference between sequentially captured input images. In the present exemplary embodiment, the detection unit 121 performs matching processing on an area not including an image of the moving object in the initial image, but including the image of the moving object having appeared in the working space in the subsequent captured image, with reference to a human hand shape model having been stored beforehand. If likelihood of the matching is higher than a predetermined value, the detection unit 121 determines that the processed area is an area in which the user's hand is included.

On the other hand, the detection unit 121 determines an area not including a image of the moving object in the initial image, but including in a subsequently captured image the image of the moving object currently stationary after the moving object has appeared in the working space as a target physical object subject to the object reading processing or an area in which a displayed virtual object has been detected.

Through the above-mentioned processing, the detection unit 121 can acquire positional information about the target object present in the working space. The detection unit 121 can also acquire positional information about the virtual object when the detection unit 121 obtains projection image data from the display control unit 128. When the detection unit 121 performs the above-mentioned processing, it may be referred to as "detecting the user's hand" or "detecting the target object" in the following description. The detection unit 121 continuously performs the processing for detecting the user's hand regardless of the position of the gesture recognition area that is present in a predetermined imaging area.

An identification unit 122 includes the CPU 111 which can execute a program and process data loaded into the RAM 113 from the ROM 112. The identification unit 122 can identify the type of the target object detected by the detection unit 121. More specifically, the identification unit 122 can identify whether the target object is a paper, a book, or a projection image based on a matching between image information about a partial area of the captured image that includes the target object, thickness information about the target object detected by the distance sensor 105, and a sample model stored beforehand.

In the present exemplary embodiment, the paper includes a piece of paper that is not folded. For example, the paper can be an ordinary paper having a normal size of A4 or B5 or a non-regulated printed product such as a receipt paper or a memo paper. The identification unit 122 can determine that the target object is a paper if the thickness of the target object is negligible, or when the result of image feature analysis indicates that a spine is not present, or when a staple or any other fixing member is not used to stitch the target object.

Further, the identification unit 122 can determine that the target object is a book if the thickness of the target object is equal to or greater than a predetermined value, or when the result of image feature analysis indicates the presence of the spine of the book. The identification unit 122 can identify the target object as a part of the projection image based on a signal obtained from the display control unit 128. The detection unit 121 stores positional information about the identified target object in the RAM 113.

The specifying unit 123 includes the CPU 111 which can execute a program and process data loaded into the RAM 113 from the ROM 112. The specifying unit 123 can identify the position and the state of the user's hand detected by the detection unit 121 in relation to the target object detected by the detection unit 121. However, the processing to be performed by the specifying unit 123 starts in response to a detection of the target object by the detection unit 121. More specifically, the specifying unit 123 starts its processing when a part of the moving object having been inserted in the working space is detected as being stationary.

The specifying unit 123 specifies the direction of the user based on an insertion direction of the user's hand detected by the detection unit 121 on the image captured by the imaging unit 120. Then, the specifying unit 123 defines the relationship of the specified direction of the user and the coordinate system. The specifying unit 123 identifies the position of the user's hand relative to the target object detected by the detection unit 121 with reference to the defined direction, or the position at which a specific portion, such as a fingertip of the user's hand, is present (e.g., at a contour of the target object) and identifies the state of the user's hand.

The specifying unit 123 can identify the state of the user's hand, for example, using a hand model that corresponds to a characteristic state, such as "gripping target object" state or "pressing target object" state. The specifying unit 123 can specify the present state of the user's hand using matching processing that is similar to the processing having been performed by the detection unit 121 to detect whether the moving object is a human hand.

The estimation unit 124 includes the CPU 111, which can execute a program and process data loaded into the RAM 113 from the ROM 112. The estimation unit 124 can estimate an operation that will be possibly performed by the user. In this case, based on an operation dictionary stored in the storage unit 127, the estimation unit 124 specifies the type of the target object identified by the identification unit 122 and an operation associated with information specified by the specifying unit 123. The estimation unit 124 generates an estimation result based on the specified result. Then, by referring to the operation dictionary, the estimation unit 124 can estimate area information associated with the estimated operation as a gesture area that is suitable for a gesture operation that will be possibly performed next. Then, the estimation unit 124 identifies information that indicates the area.

The setting unit 125 includes the CPU 111, which can execute a program and process data loaded into the RAM 113 from the ROM 112. The setting unit 125 can set a gesture recognition area that is usable to recognize a gesture operation. In the present exemplary embodiment, in an initial state immediately after a power source of the information processing apparatus is turned on, the setting unit 125 sets an area that can encompass the entire region of the operation plane 102 as the gesture recognition area.

Then, if the identification unit 122 identifies a target object other than the user's hand, the setting unit 125 sets a new gesture recognition area in a peripheral region of the identified target object. The predetermined recognition area to be set in this case is an area having size and position that are comparable to those of the target object. More specifically, the setting unit 125 performs a gesture recognition area setting operation in such a way as to encompass a circumscribed rectangle of the target object.

Further, a coordinate system to be employed to define the direction of a user's gesture is defined based on the direction of a hand (or an arm) at the time when the user has inserted the target object into the working space. However, if the object is a virtual object (e.g., a projection image), it is feasible to add appropriate modification that can be defined based on the projection direction. Further, the setting unit 125 can set at least a part of the predetermined imaging area of the imaging unit 120 as the gesture recognition area, based on information indicating the gesture area suitable for the gesture operation having been estimated by the estimation unit 124.

The recognition unit 126 includes the CPU 111, which can execute a program and process data loaded into the RAM 113 from the ROM 112. The recognition unit 126 can track a movement of the user's hand in the gesture recognition area having been set by the setting unit 125 and recognize an operation based on the movement of the user's hand. More specifically, the recognition unit 126 identifies an operational command that corresponds to the tracked hand movement. More specifically, the recognition unit 126 tracks a sequential movement of the user's hand from a gesture start time when the detection unit 121 first detects the user's hand in the gesture recognition area to a gesture end time when the user's hand has exited from the gesture recognition area.

Then, the recognition unit 126 performs matching processing on the tracked movement of the user's hand with reference to each gesture model stored in advance in the storage unit 127. The recognition unit 126 identifies an operational command that is associated with the model whose matching result satisfies a given condition. The operational command is, for example, an instruction to cause the imaging unit 120 to perform reading processing or an instruction to cause the display control unit 128 to change the display content.

However, in the present exemplary embodiment, the recognition unit 126 determines that "the detection of the user's hand has been started in the gesture recognition area" if the user's hand is already present in the recognition area when the recognition area is set.

Further, when the user's hand movement is tracked in the present exemplary embodiment, the recognition unit 126 obtains a centroid position of an area that includes a palm of the user in an image captured by the imaging unit 120. Then, the recognition unit 126 recognizes a change of the centroid position as a positional movement of the user's hand, based on the fact that the movement of the centroid position is relatively stable compared to a modification of the area that includes the palm of the user. However, the target to be tracked is not limited to the above-mentioned centroid and can be the entire area that encompasses the palm of the user or can be a center point or any other feature point.

Further, the recognition unit 126 according to the present exemplary embodiment can recognize a user's touch operation that can be performed by touching the operation plane. The recognition unit 126 can recognize the position touched by the user based on positional information of a fingertip, which is included in the user's hand detected by the detection unit 121, and the output signal of the distance sensor 105.

When the recognition unit 126 recognizes a touch operation performed on the operation plane, the recognition unit 126 tracks a fingertip position of a stretched user's finger in the area that includes the palm of the user, which is included in the image captured by the imaging unit 120, during a period of time from touch to release on the operation plane. The recognition unit 126 recognizes the locus of the above-mentioned tracking operation as the movement of the user's finger during the touch operation.

The storage unit 127 corresponds to the storage device 114. The storage unit 127 stores the operation dictionary to be used in the processing according to the present exemplary embodiment and information about gesture models associated with respective operational commands. The gesture model is information about a reference model that can be referred to with respect to the change of position and the change of shape during a period of time from start to end of the detection of the user's hand in the gesture recognition area.

The display control unit 128 includes the CPU 111, which can execute a program and process data loaded into the RAM 113 from the ROM 112. The display control unit 128 can generate a display image to be output to the display unit 129 according to an operational command instruction recognized by the recognition unit 126.

The display unit 129 includes the display apparatus 103 and the CPU 111. The display unit 129 can display a display image generated by the display control unit 128 on the operation plane. In the present exemplary embodiment, the display apparatus 103 is a projector. Therefore, the display unit 129 can perform display processing by projecting the image on the operation plane.

FIG. 2A illustrates a table that lists examples of operation contents that can be recognized in the present exemplary embodiment. The operations included in the table illustrated in FIG. 2A are not limited to gesture operations and can be touch operations or preparatory operations prior to the gesture operations. In an item 204, each operation suffixed with a white circle "0" is the "gesture operation" whose operational command can be specified based on a sequential movement of the user's hand performed in the gesture recognition area from detection start to detection termination in the present exemplary embodiment. Regarding respective gesture operations, association information that associates a model indicating a hand movement 201 with a command indicating instruction content 202 is stored in the storage unit 127. The recognition unit 126 can recognize these gesture operations by referring to the above-mentioned association information.

For example, in the present exemplary embodiment, as mentioned above, when a book that serves as the target object is placed on the operation plane, the information processing apparatus 100 recognizes a hand movement to turn a page of the book as a gesture operation and reads a double-page spread each time the page is newly turned. In the following description, the above-mentioned gesture operation is referred to as the "page turning" operation.

Further, in the present exemplary embodiment, the information processing apparatus 100 recognizes a user's hand movement that causes a target object (e.g., a paper, a book, or projected image data) to move or rotate as an operation performed by the user. The information processing apparatus 100 resets the recognition area with reference to the position and the direction of the target object having been moved or rotated, because the position at which a gesture operation relating to the target object is performed will shift significantly in response to a positional change of the target object. In the present exemplary embodiment, the above-mentioned user's hand operations are referred to as "paper moving", "book moving", and "(image data) dragging" operations, respectively. In other words, these operations are preparatory operations prior to the gestures to be performed next.

Further, in the present exemplary embodiment, the information processing apparatus 100 recognizes a user's hand movement that reverses a paper as a gesture operation. When the user's paper reversing operation has been completed, more specifically, when the state of the reversed paper is stationary, the information processing apparatus 100 performs reading processing. In the present exemplary embodiment, the above-mentioned gesture operation is referred to as a "reversing" operation.

Further, in the present exemplary embodiment, the information processing apparatus 100 recognizes a movement of the user's hand as a gesture operation if the user's hand moves in the left direction (i.e., from the right to the left or in the right direction (i.e., from the left to the right) above the projected image data. In response to the gesture operation, the information processing apparatus 100 changes the displayed image data.

In the present exemplary embodiment, if the user's hand moves in the left direction, the information processing apparatus 100 displays a rearward part of a plurality of pieces of stored image data, which is positioned according to a predetermined display order. If the user's hand moves in the right direction, the information processing apparatus 100 displays a forward part of the plurality of pieces of stored image data, which is positioned according to the predetermined display order. In the present exemplary embodiment, the above-mentioned gesture operations are referred to as a "left swiping" operation and a "right swiping" operation, respectively.

Further, in the present exemplary embodiment, the information processing apparatus 100 recognizes a multi-touch operation (i.e., a touch operation with two or more touch points on projected image data) as an instruction to modify image data. The modification of the image data includes enlargement, reduction, and rotation of the image. Then, the information processing apparatus 100 resets the recognition area with reference to the size, the position, and the direction of the modified image data, because the position at which a gesture operation relating to the image data is performed will shift significantly in response to a modification of the image data. In the present exemplary embodiment, each of the above-mentioned multi-touch operations is referred to as an "image modifying" operation. In other words, the above-mentioned operation is a preparatory operation prior to the gesture to be performed next.

The operations listed in FIG. 2A are mere examples. The information processing apparatus 100 according to the present exemplary embodiment can store the operation dictionary that includes the above-mentioned examples in the storage unit, so that the information processing apparatus 100 can recognize various movements of the user's hand as individual gesture operations.

FIG. 2B illustrates a table that lists examples of a correspondence relationship between an estimated operation and a gesture recognition area to be set according to an estimation result. The estimation unit 124 according to the present exemplary embodiment identifies an estimated operation name 213 and a recognition area 214 that correspond to each other, based on an identified target object 210 and a hand position 211 and a hand state 212 that respectively correspond to the target object.

For example, the estimation unit 124 estimates that the operation having been performed is a "page turning" operation if the identified target object 210 is a book, the hand position 211 is adjacent to the contour of the target object (i.e., the book), and the hand state 212 is a "gripping target object" state. In the present exemplary embodiment, if a part of the hand is concealed by the target object and is not involved in a captured image, the estimation unit 124 determines that the hand state 212 is the "gripping target object" state.

The reason why the estimation unit 124 estimates the execution of the "page turning" operation based on the above-mentioned conditions is because a user who intends to turn a page usually moves the hand toward the contour of the target object (i.e., the book) to grip an edge of the page and there is a higher possibility that a finger (i.e., a part of the hand) will be positioned beneath the page.

Then, after the execution of the "page turning" operation is estimated by the estimation unit 124, the setting unit 125 sets a recognition area having a size capable of accommodating double-page spread of the book and the hand in the "gripping target object" state so that the hand movement can be fully detected in the recognition area. In this manner, a plurality of pieces of association information, each representing a correspondence relationship between a position at which a user possibly moves the hand to perform a gesture operation and a possible hand state at this moment, is stored as illustrated in FIG. 2B.

FIG. 3 is a flowchart illustrating an example flow of main processing that can be performed by the information processing apparatus 100 to recognize a gesture operation according to the present exemplary embodiment. In the present exemplary embodiment, the information processing apparatus 100 launches the main processing illustrated in FIG. 3 in response to a turning-on operation of the power source of the information processing apparatus 100. Further, the information processing apparatus 100 can launch the main processing illustrated in FIG. 3 when a specific application is performed, or in response to a selection of an operation mode.

In step S301, the setting unit 125 sets a partial area of the predetermined imaging area of the imaging unit 120, which includes the entire area of the operation plane 102, as the gesture recognition area. In this case, a coordinate system that defines the recognition area is initially set to include the x axis and the y axis illustrated in FIG. 1A.

In the present exemplary embodiment, the initial setting of the coordinate system is performed in such a way as to satisfy the following relationships when seen from the user. The positive side of the y axis is the forward direction. The negative side of the y axis is the rearward direction. The positive side of the x axis is the right direction. And, the negative side of the y axis is the left direction.

In step S302, the imaging unit 120 starts an image capturing operation in the working space. The detection unit 121 starts detecting a user's hand and a target object based on the image captured by the imaging unit 120. In the present exemplary embodiment, the detection unit 121 detects a moving object that is present in the working space based on the image captured by the imaging unit 120. If the shape of the moving object is similar to a human hand model stored beforehand, the detection unit 121 detects the moving object as the user's hand. Accordingly, the information processing apparatus 100 can recognize a gesture operation that is performed at this moment and is not related to the target object.

In step S303, the detection unit 121 determines whether the target object has been inserted into the working space. In the present exemplary embodiment, if the shape of the moving object that is present in the working space is not similar to the human hand model stored beforehand, the detection unit 121 determines that the user has inserted a physical object, as the target object, into the working space.

Further, if a user operation having been input is an instruction to project image data on the operation plane, the detection unit 121 determines that a virtual object has been inserted as the target object into the working space upon starting the image data projection. If it is determined that the target object has been inserted into the working space (YES in step S303), the processing proceeds to step S304. When it is determined that the target object is not yet inserted into the working space (NO in step S303), the detection unit 121 waits for a while until the target object is inserted.

In step S304, the detection unit 121 stores a captured image at the moment when the target object has been inserted into the working space. In the present exemplary embodiment, the detection unit 121 stores an image captured by the imaging unit 120, which is used in the processing when it is determined that the target object has been inserted in the working space, in the RAM 113. The above-mentioned captured image is, for example, an image captured when the user's hand places the target object on the operation plane or when an instruction to project image data is input.

In step S305, the identification unit 122 identifies the inserted target object. In the present exemplary embodiment, if the determination with respect to the insertion of the target object is based on a projection instruction of image data, the identification unit 122 identifies that the target object is a projection image.

On the other hand, if the inserted object is the target object, the identification unit 122 performs identification processing based on the image captured by the imaging unit 120, using an appropriate image feature analysis method. For example, the identification unit 122 determines whether the target object is a book, a paper, or a projection image based on a matching between image information about an area which includes the target object placed on the operation plane and a sample model having been stored beforehand. In this case, if the target object is the book, the identification unit 122 determines whether the book is opened or closed.

In step S306, the setting unit 125 sets a recognition area that suits for the identified target object and the user position.

Figure 4:
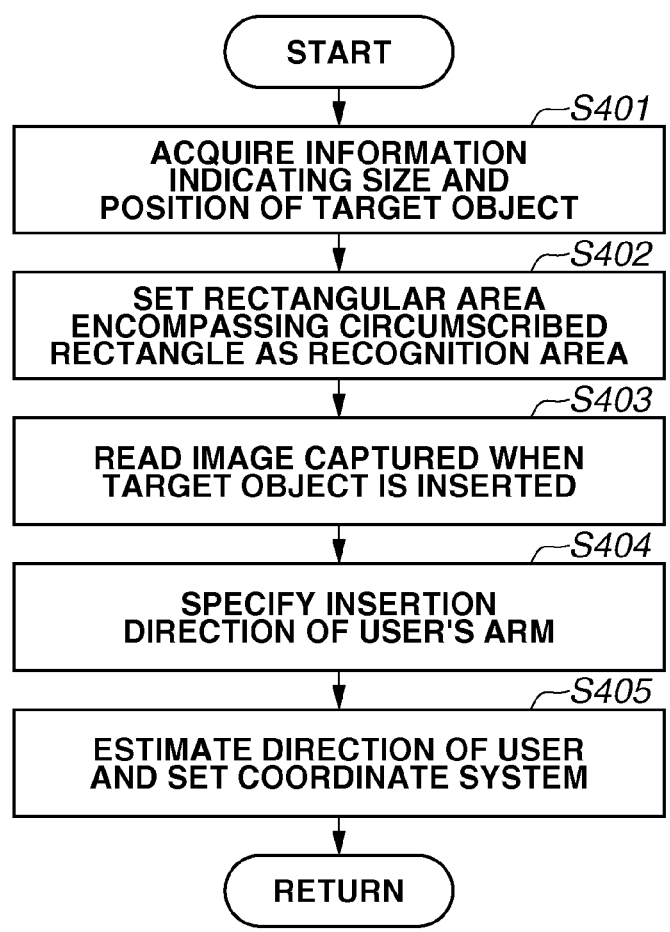
FIG. 4 is a flowchart illustrating an example flow of processing that can be performed by the information processing apparatus to set a recognition area with reference to a target object and a user position.

FIG. 4 is a flowchart illustrating an example flow of the processing that can be performed by the information processing apparatus 100 in step S306 to set an appropriate recognition area based on the target object and the user position.

In step S401, the detection unit 121 acquires information about the size and the position of the target object having been inserted in the working space, based on the image captured by the imaging unit 120. In the present exemplary embodiment, the detection unit 121 detects an area including the captured target object and extracts positional information indicating a circumscribed rectangle from the feature points, in the latest image captured by the imaging unit 120. In other words, the detection unit 121 acquires information about the size and the position of the target object. In the present exemplary embodiment, the detection unit 121 acquires coordinate values of four vertices that cooperatively constitute the circumscribed rectangle. However, it is also useful that the detection unit 121 acquires coordinate information about at least one vertex and size information (e.g., the width) about the circumscribed rectangle.

In step S402, the setting unit 125 sets a rectangular area that can encompass the circumscribed rectangle as the recognition area. In the present exemplary embodiment, in chasing a user's hand movement, the information processing apparatus 100 chases the centroid of an area that includes a captured palm portion. In a case where the user's hand grips the target object, the centroid of the area that includes the captured palm portion is present at a position being offset outward from the target object.

Accordingly, when the target object is gripped by the user's hand, the setting unit 125 sets a rectangular area that is greater than the circumscribed rectangle by a predetermined marginal amount, as a new recognition area, so that the centroid position of the palm can be included in the recognition area.

In step S403, the detection unit 121 reads the captured image stored in step S304 (i.e., the image captured at the moment when the target object has been inserted into the working space) from the RAM 113.

In step S404, the detection unit 121 identifies an insertion direction of the user's arm in relation to the working space, based on the read image. For example, the detection unit 121 extracts the user's arm and the palm portion from the image and identifies an intersectional portion where the arm intersects with the contour of the operation plane. The detection unit 121 designates the direction of a vector that extends from the specified intersectional portion to the centroid (or the center) of the user's palm as the insertion direction of the user's arm. In the present exemplary embodiment, the information processing apparatus 100 discards the captured image stored in the RAM 113 in step S304 when the detection unit 121 has terminated the above-mentioned processing (i.e., the processing to be performed in step S404).

In step S405, the setting unit 125 estimates the direction of the user based on the specified insertion direction and sets the coordinate system to be applied to the recognition area. In the present exemplary embodiment, it is considered that the vector passing through the center point of the operation plane and extending in the direction specified in step S404 coincides with line-of-sight direction of the user. Further, the start point of the vector is regarded as the position where the user is present.

Accordingly, the setting unit 125 designates the direction extending from the position where the user is present to the center point of the operation plane as the forward direction when it is seen from the user. Then, with reference to the designated direction, the setting unit 125 newly sets a coordinate system that defines the back-and-forth direction and the right-and-left direction of the user in relation to the recognition area having been set in step S403. The setting unit 125 specifies the direction of a gesture operation, if the gesture is performed, using the gesture coordinate system having been set as mentioned above.

In this case, the information processing apparatus 100 can adjust the recognition area in such a way as to become parallel to the newly set coordinate system. In the flowchart illustrated in FIG. 4, the information processing apparatus 100 performs the coordinate system setting processing after completing the recognition area (position and size) setting processing. However, the order of the above-mentioned sequentially performed operations can be reversed if it is preferable.

As mentioned above, in the present exemplary embodiment, at the time when the target object is inserted in the working space, the information processing apparatus 100 sets the recognition area having the size suitable for the circumscribed rectangle of the target object together with the coordinate system that match the user position.

When the recognition area having the size suitable for the target object is set, it becomes easy for the user to perform a gesture operation relating to the target object because the user is not required to perform any exaggerated operation. Further, when the coordinate system that matches the user is set, the information processing apparatus 100 can accurately discriminate and recognize each user's hand movement (e.g., a movement "from right to left" or a movement "from left to right").

In particular, when the processing to be performed on the image data is processing to be performed without changing the shape of the target object (e.g., the left or right swiping), the information processing apparatus 100 can effectively use the recognition area to be set in step S306. The left or right swiping can be recognized by detecting the user's hand that moves from the right to the left or from the left to the right in the gesture area having been set.

When the setting of the recognition area and the coordinate system is completed, the operation returns to the main processing illustrated in FIG. 3.

Next, in step S307, the identification unit 122 determines whether the target object having been inserted in the working space, i.e., the target object identified in step S305, is a paper or an opened (or spread) book. If it is determined that the target object (i.e., the object identified in step S305) is the paper or the spread book (YES in step S307), the processing proceeds to step S308. If it is determined that the target object (i.e., the object identified in step S305) is not the paper or the spread book (NO in step S307), the processing proceeds to step S309.

In step S308, the imaging unit 120 performs reading processing on the target object and acquiring image data representing the content of the paper or the book.

The identification unit 122 and the imaging unit 120 perform the processing in steps S307 and S308 based on the following setting. In the present exemplary embodiment, placing the paper or the spread book on the operation plane is an instruction to perform the reading processing on the target object. Accordingly, when the user sequentially performs a plurality of reading operations by reversing each paper or turning each page of the book, the user is not required to input an explicit operation and therefore speedy processing can be realized. However, the information processing apparatus 100 can omit the processing of steps S307 and S308 if the information processing apparatus 100 performs reading processing only when the user performs an operation to instruct the reading.

In step S309, the specifying unit 123 identifies the state of the user's hand in relation to the target object. The specifying unit 123 determines whether the state of the user's hand coincides with any one of example states of the user's hand listed in the item 212 of the table illustrated in FIG. 2B.

Figure 5:
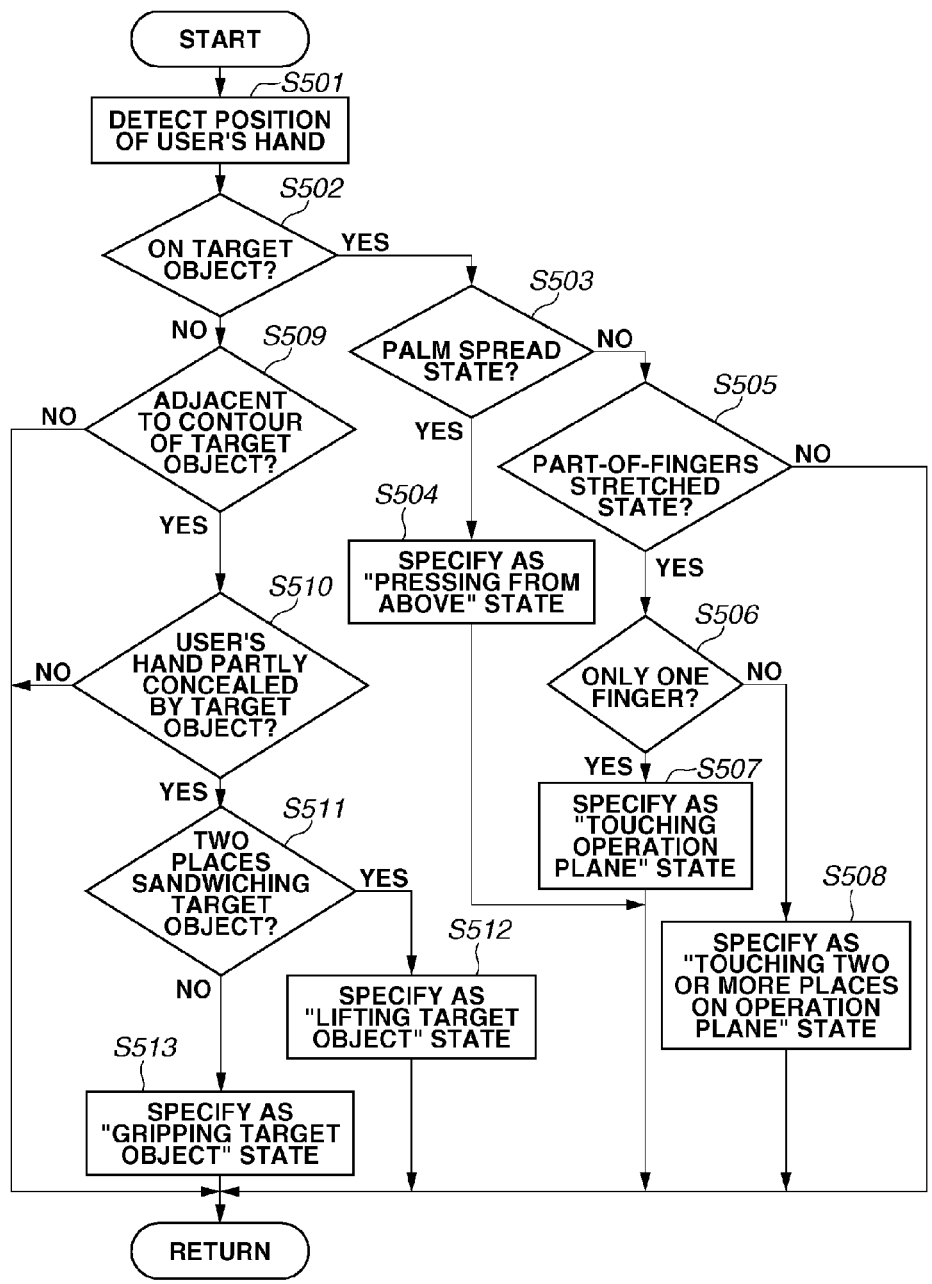
FIG. 5 is a flowchart illustrating an example flow of processing that can be performed by the information processing apparatus to detect the state of a hand.

FIG. 5 is a flowchart illustrating an example flow of the processing to be performed by the information processing apparatus 100 in step S309 to detect the state of the user's hand.

In step S501, the detection unit 121 detects the present position of the user's hand based on the image captured by the imaging unit 120. In the present exemplary embodiment, the detection unit 121 obtains a centroid position of a partial area of the captured image, in which a user's palm is present, and designates the obtained centroid position as the position of the user's hand. In this case, it is useful to provide a processing step of waiting for a while until the user's hand becomes stationary for a predetermined time or more. The detection unit 121 can accurately identify the state of the user's hand by detecting the position where the user's hand is constantly stationary.

In step S502, the specifying unit 123 determines whether the detected user's hand is positioned on the target object based on the image captured by the imaging unit 120. If it is determined that the detected user's hand is positioned on the target object (YES in step S502), the processing proceeds to step S503. If it is determined that the detected user's hand is not positioned on the target object (NO in step S502), the processing proceeds to step S509.

In step S503, the specifying unit 123 determines whether the state of the user's hand is a palm spread state, based on the image captured by the imaging unit 120. In the present exemplary embodiment, the specifying unit 123 performs matching processing on a characteristic shape of the area including the palm with reference to each preliminarily stored model that represents a palm spread state to determine the state of the user's hand. In another step, the information processing apparatus 100 similarly performs processing for determining the state of the user's hand. If it is determined that the state of the user's hand is the palm spread state (YES in step S503), the processing proceeds to step S504. If it is determined that the state of the user's hand is not the palm spread state (NO in step S503), the processing proceeds to step S505.

In step S504, the specifying unit 123 specifies the state of the user's hand as being in a "pressing from above" state. Then, the operation returns to the main processing illustrated in FIG. 3. The processing to be performed in steps S503 and S504 is based on an ordinary user's operation with the hand being in the spread state when the user moves the paper while pressing the paper from above, in the present exemplary embodiment. Thus, the specifying unit 123 can accurately discriminate the above-mentioned operation from other operations. However, the state of the user's hand is not limited to the palm spread state. The palm spread state can be replaced by another state.

On the other hand, in step S505, the specifying unit 123 determines whether the state of the user's hand is a part-of-fingers stretched state, based on the image captured by the imaging unit 120. If it is determined that the state of the user's hand is the part-of-fingers stretched state (YES in step S505), the processing proceeds to step S506. If it is determined that the state of the user's hand is not the part-of-fingers stretched state (NO in step S505), the operation returns to the main processing illustrated in FIG. 3 without specifying the state of the user's hand.

In step S506, the specifying unit 123 determines whether only one finger is stretched based on the image captured by the imaging unit 120. For example, when the user stretches a plurality of fingers (e.g., a thumb and an index finger) of one hand or when the user stretches one or more fingers of each hand, the specifying unit 123 determines that the number of the stretched fingers is not only one finger. If it is determined that only one finger is stretched (YES in step S506), the processing proceeds to step S507. If it is determined that the number of the stretched fingers is not only one, namely when two or more fingers are stretched (NO in step S506), the processing proceeds to step S508.

In step S507, the specifying unit 123 specifies the state of the user's hand as being in a "touching operation plane" state. Then, the operation returns to the main processing illustrated in FIG. 3.

In step S508, the specifying unit 123 specifies the state of the user's hand as being in a "touching two or more places on operation plane" state. Then, the operation returns to the main processing illustrated in FIG. 3.

In step S509, the specifying unit 123 determines whether the detected position of the user's hand is adjacent to the contour of the target object, based on the image captured by the imaging unit 120. If it is determined that the detected position of the user's hand is adjacent to the contour of the target object (YES in step S509), the processing proceeds to step S510. If it is determined that the detected position of the user's hand is not adjacent to the contour of the target object (NO in step S509), the operation returns to the main processing illustrated in FIG. 3 without specifying the state of the user's hand.

In step S510, the specifying unit 123 determines whether a part of the user's hand is concealed by the target object, based on the image captured by the imaging unit 120. In the present exemplary embodiment, to perform the determination processing in step S510, the specifying unit 123 performs matching processing on features of the shape of an area that includes the palm with reference to a human hand model stored beforehand according to which the palm is partly concealed by a lower or side surface of the target object to grip the target object. Alternatively, in determining whether the user's hand is currently gripping the target object, the specifying unit 123 can determine whether a positional relationship between specific fingers satisfies a predetermined condition.

If it is determined that the user's hand is partly concealed by the target object (YES in step S510), the processing proceeds to step S511. If it is determined that the state of the user's hand is not the part-of-fingers stretched state (NO in step S510), the operation returns to the main processing illustrated in FIG. 3 without specifying the state of the user's hand.

In step S511, the specifying unit 123 determines whether the position of the user's hand, which has been determined as being partly concealed by the target object, is present between two places that sandwich the target object. If it is determined that the position of the user's hand is present between two places that sandwich the target object (YES in step S511), the processing proceeds to step S512. If it is determined that the position of the user's hand (i.e., the state of the user's hand) is not present between two places that sandwich the target object (NO in step S511) the processing proceeds to step S513.

In step S512, the specifying unit 123 specifies the state of the user's hand as being in a "lifting target object" state. Then, the operation returns to the main processing illustrated in FIG. 3. In the present exemplary embodiment, the processing to be performed in step S512 is based on an ordinary user's operation to lift the book with both hands, which can be discriminated from the page turning operation.

However, for example, a thin book that is similar to a paper may be handled in an actual operation. In this case, it is feasible to move the target object while pressing the target object. If the method selected by the user is moving the target object while pressing it from above, the user's hand can be specified as being in the "pressing from above" state through the processing in steps S502, S503, and S504.

In step S513, the specifying unit 123 specifies the state of the user's hand as being in the "gripping target object" state. Then, the operation returns to the main processing illustrated in FIG. 3.

Referring back to the main processing flowchart illustrated in FIG. 3, in step S310, the estimation unit 124 estimates an operation to be performed next. The estimation unit 124 refers to the operation dictionary stored in the storage unit 127 and identifies an operation that is associated with the state of the user's hand specified in the processing of step S309 and the target object identified in step S305.

The operation dictionary stores association information which is, for example, illustrated in FIG. 2B. If the operation corresponding to the combination of the state of the user's hand specified in the processing of step S309 and the target object identified in step S305 is not stored in the operation dictionary, the estimation unit 124 generates an estimation result informing that any specific operation cannot be estimated. Similarly, when the state of the user's hand cannot be specified in step S309, the estimation unit 124 generates an estimation result informing that any specific operation cannot be estimated.

In step S311, the estimation unit 124 determines whether the specific operation has been estimated. If a gesture operation stored in the operation dictionary can be specified as the processing result obtained in step S310, it is determined that the specific gesture operation has been estimated (YES in step S311). Then, the processing proceeds to step S312. If a specific gesture operation cannot be estimated as the processing result obtained in step S310, it is determined that the specific gesture operation has not been estimated (NO in step S311). Then, the processing proceeds to step S313.

In step S312, the setting unit 125 resets the recognition area by performing processing that is suitable for each estimated operation. The processing to be performed for each estimated operation is described in detail below.

In step S313, the recognition unit 126 recognizes a user's gesture operation in the gesture recognition area having been set in step S312. The information processing apparatus 100 responds to the gesture operation performed by notifying each functional unit of the recognized result. For example, the imaging unit 120 performs reading processing. The display control unit 128 changes the content of an image to be projected on the operation plane and output the changed image data to the display unit 129. If no gesture operation is performed during a predetermined period of time, the processing directly proceeds to step S314.

In step S314, the recognition unit 126 determines whether a termination instruction has been input. The termination instruction is, for example, an operation to turn off the power source of the information processing apparatus 100 or an instruction to terminate the application based on a GUI operation. If it is determined that the termination instruction has been input (YES in step S314), the information processing apparatus 100 terminates the main processing illustrated in FIG. 3. If it is determined that the termination instruction has not been input (NO in step S314), the processing proceeds to step S315.

In step S315, the detection unit 121 determines whether the target object determined as being inserted in the working space in step S303 has been removed from the working space, based on the image captured by the imaging unit 120. If it is determined that the target object has been removed from the working space (YES in step S315), the operation returns to step S301. If it is determined that the target object has not been removed from the working space (NO in step S315), the operation returns to step S309 in which the specifying unit 123 repetitively estimates an operation to be performed next and resets the recognition area.

FIGS. 6A to 6D are flowcharts each illustrating an example of the processing to be performed in step S312, to set the recognition area that is suitable for each estimated operation. Each processing is described in detail below.

<In Case of "Paper Moving", "Book Moving", and "Dragging" operations>

Figure 6A:
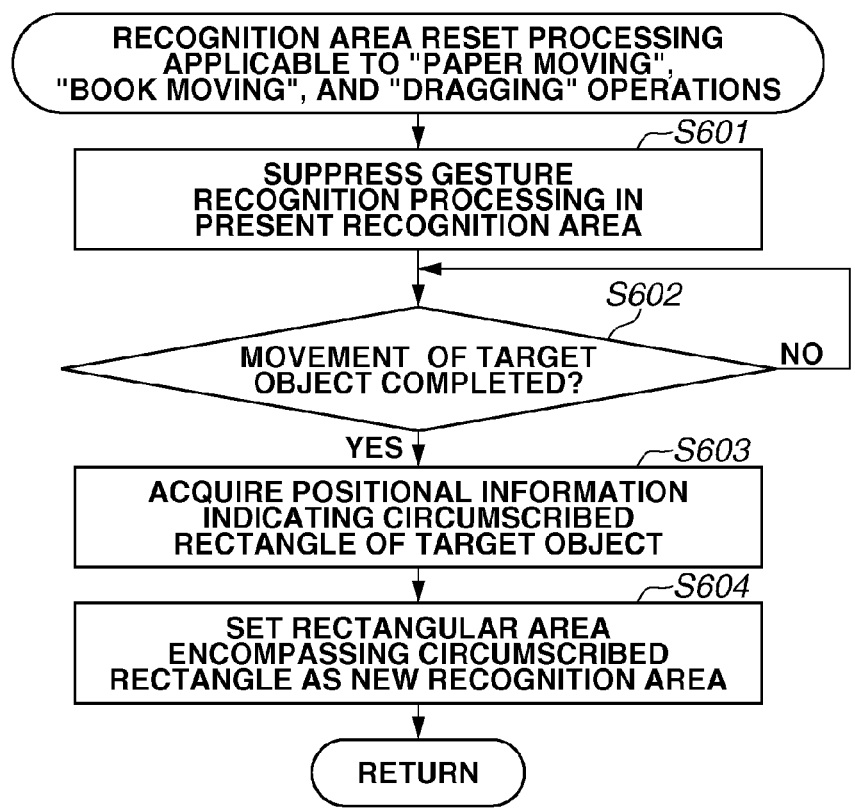

FIG. 6A is a flowchart illustrating an example of the recognition area reset processing, which is preferably employable when the estimated operation is any one of "paper moving", "book moving", and "dragging" operations.

In step S601, the setting unit 125 suppresses the recognition unit 126 from performing the gesture recognition processing in the present recognition area. As indicated in the recognition area 214 of FIG. 2B, when the estimated gesture is any one of "paper moving", "book moving", and "dragging" operations, the information processing apparatus 100 does not perform the gesture operation recognition processing until the movement terminates, in order to prevent the user's hand movement from being erroneously recognized as the movement of a gesture operation in the case where the user's hand moving the target object is included in the recognition area.

In step S602, the detection unit 121 determines whether the movement of the target object in the working space has been completed, based on the image captured by the imaging unit 120. In the present exemplary embodiment, the detection unit 121 determines that the movement has been completed if the target object area of the captured image is stationary for a predetermined time or more.

When the gesture operation is the "dragging" operation, the information processing apparatus 100 additionally performs processing for changing the display position of image data according to the movement of a touch position. If it is determined that the movement has been completed (YES in step S602), the processing proceeds to step S603. If it is determined that the movement has not yet been completed (NO in step S602), the detection unit 121 repeats the processing in step S602 until the movement is completed.

In step S603, the detection unit 121 acquires positional information indicating a circumscribed rectangle of the stationary target object based on the image captured by the imaging unit 120.

In step S604, the setting unit 125 sets a rectangular area that can encompass the circumscribed rectangle, as a new recognition area, based on the positional information acquired in step S603. The processing to be performed in steps S603 and S604 is similar to the processing having been performed in steps S401 and S402.

As mentioned above, if the estimated operation to be performed next is any one of "paper moving", "book moving", and "dragging" operations, the information processing apparatus 100 resets the gesture operation recognition area with reference to the moved target object while suppressing any error recognition of the gesture that may occur before the movement terminates.

<In Case of "Reversing" Operation>

Figure 6B:
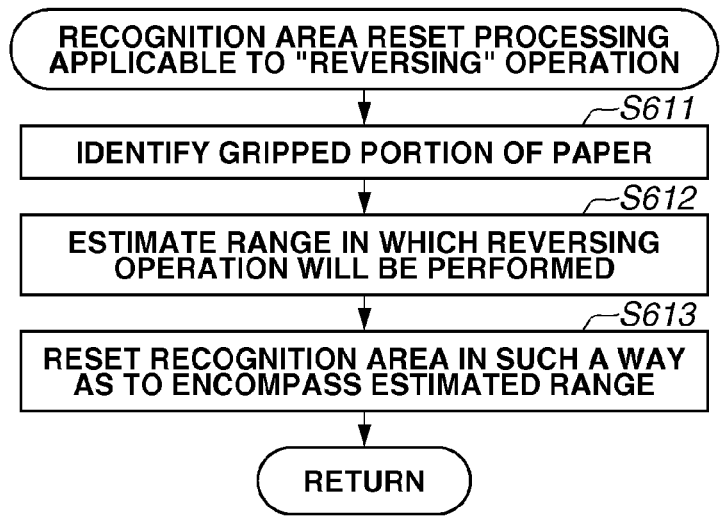

FIG. 6B is a flowchart illustrating an example of the recognition area reset processing, which is preferably employable when the estimated operation is the "reversing" gesture operation.

In step S611, the detection unit 121 identifies a gripped portion of a paper. For example, if the paper to be processed is a rectangular paper, the detection unit 121 determines whether the gripped portion is any one of front, rear, left, and right sides of the rectangular paper, when seen from the user, or a portion around the center of the side, or a portion adjacent to the edge of the paper, with reference to the coordinate system being set on the operation plane.

In step S612, the setting unit 125 estimates a range in which the reversing operation will be performed based on the specified portion. In general, when the user intends to place the paper again at the original position on the operation plane after reversing the paper, the size or the direction of the range in which the user's hand moves in the reversing operation is variable depending on the gripped portion of the paper.

In the present exemplary embodiment, the range in which the reversing operation will be performed is a range in which the centroid of an area including the palm of the user who performs the reversing operation moves, in the image captured by the imaging unit 120. For example, in the case where the user reverses a piece of paper, it is feasible to reverse the paper without greatly moving the hand in the direction extending along the x-y plane if the gripped portion is the center of the side of the paper. On the other hand, in the case where the user reverses the paper while holding an edge thereof, it can be considered that there is a higher possibility that the movement of the hand will not be negligible in the direction extending along the x-y plane.

As an example, if the portion gripped by the user is the foreside of the paper and is relatively adjacent to the left end thereof, there is a higher possibility that the hand may move in the right direction when the user performs the reversing operation. Further, if the portion gripped by the user is the rear side of the paper and is relatively adjacent to the right end thereof, there is a higher possibility that the hand may move in the forward direction when the user performs the reversing operation.

As mentioned above, when the position gripped by the user is offset to an edge of the paper, it can be estimated that the range in which the reversing operation will be performed is wide, compared to a case where the gripped position is the center of an edge of the paper.

It is desired that the estimated range has a sufficiently larger size considering the possibility that an irregular movement may occur in the reversing operation or in the case where the shape of the paper is not rectangular.

In the present exemplary embodiment, when the information processing apparatus chases the movement of the user's hand, the information processing apparatus chases the centroid of the area including the image-captured palm portion. When the user grips the target object, the centroid of the area including the image-captured palm portion is positioned outside the target object. Accordingly, when the user's hand grips the target object, the information processing apparatus sets a rectangular area with a predetermined marginal portion added to the circumscribed rectangle, as a new recognition area, in such a way as to include the centroid position of the palm in the recognition area.

The information processing apparatus performs the above-mentioned processing for standard operations. However, when the movement of a specific user is unusual, it is useful that the user can register a relationship between a paper gripping position in the reversing operation and an operation area beforehand.

In step S613, the setting unit 125 resets the recognition area in such a way as to encompass the range estimated in step S612. In the present exemplary embodiment, the setting unit 125 performs the reset processing in such a way as to extend the recognition area by adding the range having been estimated in step S612 to the recognition area having been set in step 306.

As mentioned above, when it is estimated that the "reversing" operation is next performed, the information processing apparatus 100 resets the gesture operation recognition area to expand the recognition area in such a way as to include a range in which the user's hand may move in the process of performing the reversing operation.

<In Case of "Page Turning" Operation>

FIG. 6C is a flowchart illustrating an example of the recognition area reset processing, which is preferably employable when the estimated operation is the "page turning" gesture operation.

In step S621, the detection unit 121 identifies a gripped portion of the book. In the present exemplary embodiment, the detection unit 121 determines whether the portion gripped by the user is any one of front, rear, left, and right sides of the front cover or a page of the book, when seen from the user, or positioned closely to an edge of the book, with reference to the coordinate system being set on the operation plane.

In step S622, the setting unit 125 identifies the opening direction of the book. In the present exemplary embodiment, based on the result of image analysis performed on the image captured by the imaging unit 120, the setting unit 125 acquires information indicating the position of the spine of the book in the gesture coordinate system or information indicating the writing direction (e.g., horizontal or vertical) of the text.

Further, in the present exemplary embodiment, when the identification unit identifies the target object in step S305, the identification unit can additionally identify whether the book is in a closed state or in an opened state. Accordingly, when the book is in an opened state, the setting unit 125 can detect a boundary line of the opened page based on the image analysis and can specify a direction perpendicular to the boundary line as an opening direction of the book.

Further, if the information processing apparatus cannot clearly discriminate the spine based on image features (e.g., when the processing target book is a pamphlet or any other thin book) in the closed state of the book, the setting unit 125 can estimate the opening direction of the book when the book is opened by the user based on the positional information about the user's hand specified in step S621.

In step S623, the setting unit 125 estimates a range in which the page turning operation will be performed. In the present exemplary embodiment, the range in which the page turning operation will be performed is a range in which the centroid of the area that includes the palm portion of the user who performs the page turning operation is movable, in the image captured by the imaging unit 120.

In this case, the estimation range of the setting unit 125 is a range in which the user's hand may move, which can be set in such a way as to encompass at least two times the width of one page in the book opening direction estimated in step S622. For example, when dx [dot] represents the horizontal width (i.e., the width in the y axis direction) of one page in the case where the book opening direction is the right-and-left direction in the user's coordinate system, the setting unit 125 estimates that the movable range of the user's hand is comparable to at least 2dx [dot] when the user performs the turning operation.

In step S624, the setting unit 125 resets the recognition area in such a way as to add the range estimated in step S623. In the present exemplary embodiment, the setting unit 125 expands the recognition area by adding the range estimated in step S623 to the recognition area having been set in step 306.

As mentioned above, when it is estimated that the "page turning" operation is next performed, the information processing apparatus 100 resets the gesture operation recognition area to expand the recognition area in such a way as to include the range in which the user's hand may move in the process of performing the page turning operation.

<In Case of "Image Modifying" Operation>

FIG. 6D is a flowchart illustrating an example of the recognition area reset processing, which is preferably employable when the estimated operation is the "image modifying" operation.

In step S631, the setting unit 125 suppresses the recognition unit 126 to prevent the gesture recognition processing in the present recognition area. The processing to be performed in step S631 intends to prevent a user's touch operation from being erroneously recognized as the movement of a gesture operation in the case where the user's hand movement for giving an instruction to modify image data is included in the recognition area.

In step S632, the recognition unit 126 recognizes the touch operation. The display control unit 128 modifies the image data according to the recognized operation and outputs the modified image data to the display unit 129.

In step S633, the recognition unit 126 determines whether the touch operation has been completed. In the present exemplary embodiment, if the output of the distance sensor 105 indicates that the user's hand cannot be detected within the predetermined distance from the surface of the operation plane, the recognition unit 126 determines that the touch operation has been completed. If it is determined that the touch operation has been completed (YES in step S633), the processing proceeds to step S634. If it is determined that the touch operation is not yet completed (NO in step S633), the recognition unit 126 repeats the processing in step S633 until the touch operation is completed.

In step S634, the detection unit 121 acquires positional information indicating a circumscribed rectangle of the target object (i.e., the modified image data, in this case), based on the image captured by the imaging unit 120.

In step S635, the setting unit 125 sets a rectangular area that can encompass the circumscribed rectangle, as a new recognition area, based on the positional information acquired in step S634.

As mentioned above, if the estimated operation to be performed next is the "image modifying" operation, the information processing apparatus 100 resets the gesture operation recognition area with reference to the moved target object while suppressing any error recognition of the gesture that may occur before the touch operation is completed.

As mentioned above, the information processing apparatus 100 according to the present exemplary embodiment estimates an operation that will be performed by a user and sets an appropriate gesture recognition area that is suitable for the gesture operation to be performed next.

Next, an example of the user's gesture operation and an example of the gesture recognition area that is suitable for the user's gesture operation are described in detail below.

<Example of "Reversing" Operation>

FIGS. 7A to 7D illustrate an example of the "reversing" operation, which is seen from above, on the operation plane. Accordingly, it is presumed that the y axis is set to extend in the up-and-down direction and the x axis is set to extend in the right-and-left direction, on the paper surface.

Figure 7A:
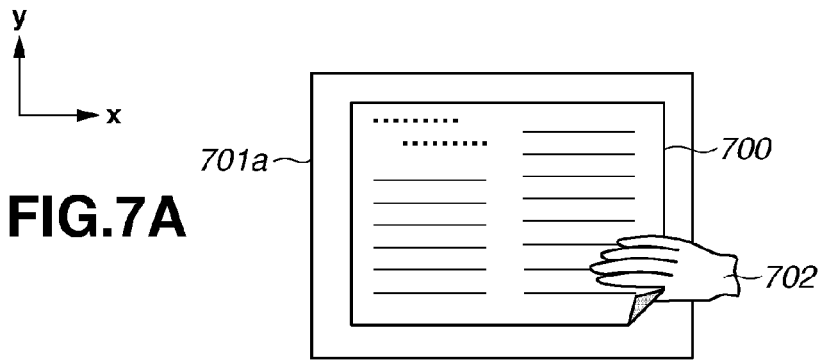
FIGS. 7A to 7D illustrate an example of a "reversing" operation.

FIG. 7A illustrates a state in which a paper 700 has been inserted in the working space. An area 701a is a gesture recognition area having been set by the setting unit 125 in step S306. In this case, the position of a user's hand 702 is adjacent to the contour of the target object (YES in step S509) and a part of the user's hand 702 is concealed by the target object (YES in step S510). Further, the position of the user's hand 702 is limited to only one place (NO in step S511). Accordingly, the specifying unit 123 specifies the state of the user's hand as being in the "gripping target object" state (see step S513). Further, taking the fact that the target object is a paper into consideration, the estimation unit 124 estimates that the user will perform the "reversing" operation (see step S310).

Figure 7B:
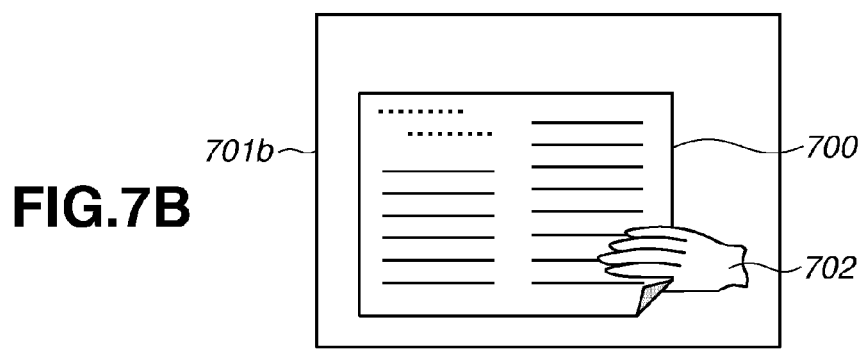

FIG. 7B illustrates a state where the gesture recognition area has been reset because the estimated operation is the "reversing" operation. From the illustration of FIG. 7B, it can be specified that the position of the paper (i.e., the target object) gripped by the user's hand 702 is adjacent to the right side of the paper and close to the lower side thereof (see step S611). In the reversing operation, there is a higher possibility that the user's hand may greatly move toward a positive side of the y axis direction. Accordingly, the information processing apparatus resets the recognition area in such a way as to expand greatly in the up-and-down direction (i.e., the y axis direction) and have a sufficiently large size in the right-and-left direction (i.e., the x axis direction), as indicated by an area 701b (see step S613).

Figure 7C:
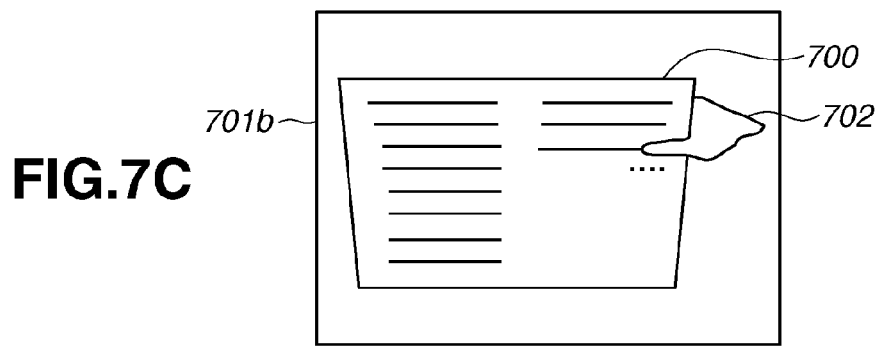

FIG. 7C illustrates a state in which the user has actually started the reversing operation. The position of the user's hand is in the recognition area 701b. Compared to FIGS. 7A and 7B, the user's hand is positioned upward (i.e., the positive side of the y axis). Further, it is understood that the paper 700 has been reversed because the paper 700 remains the same in the working space and the content of the paper 700 is different.

Figure 7D:
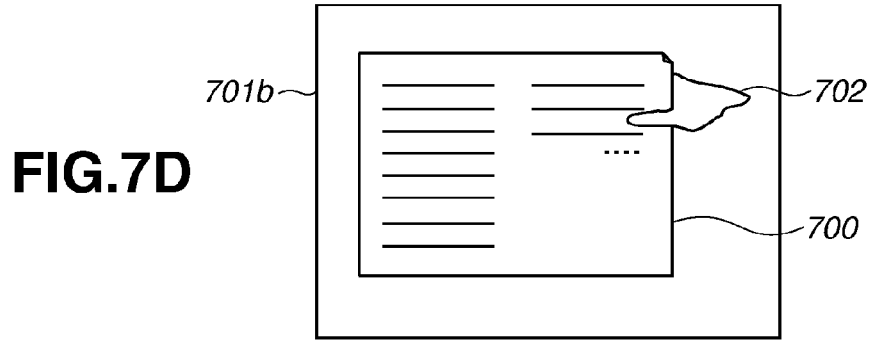

FIG. 7D illustrates a stationary state of the hand 702 at the time when the reversing operation has been completed. The information processing apparatus determines that the gesture operation has been completed when the user removes the hand 702 from the recognition area 701d (namely, when the hand 702 exits from the area 701d). The recognition unit 126 can recognize the "reversing" operation by detecting the motion of the user's hand 702 reversed together with the paper 700 or by comparing a moving amount of the hand position with a gesture model. For example, in the present exemplary embodiment, the information processing apparatus reads the reversed paper if it is determined that the "reversing" operation has been completed (see step S313).

<Example of "Page Turning" Operation>

Each of FIG. 8 and FIG. 9 illustrates an example of the recognition area in the case where the "page turning" operation has been estimated. Similar to FIGS. 7A to 7D, it is presumed that the y axis is set to extend in the up-and-down direction and the x axis is set to extend in the right-and-left direction, on the operation plane, when seen from above.

Figure 8A:
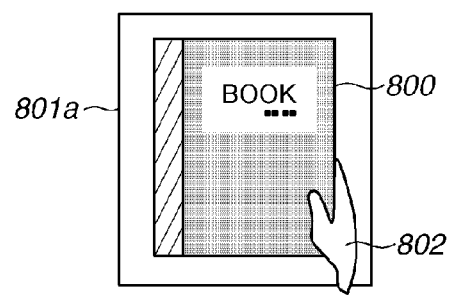
FIGS. 8A to 8D illustrate examples of the recognition area in the case where a "page turning" operation is estimated.

FIG. 8A illustrates a state of a book 800 that has been inserted in the working space. An area 801a is the gesture recognition area that has been set by the setting unit 125 in step S306. In this case, the position of a user's hand 802 is adjacent to the contour of the target object (YES in step S509) and the target object is partly concealed (YES in step S510). Further, the position of the user's hand 802 is limited to only one place (NO in step S511). Accordingly, the specifying unit 123 specifies the state of the user's hand as being in the "gripping target object" state (see step S513). Further, taking the fact that the target object is the book into consideration, the estimation unit 124 estimates that the user will perform the "page turning" operation (see step S310).

Figure 8B:
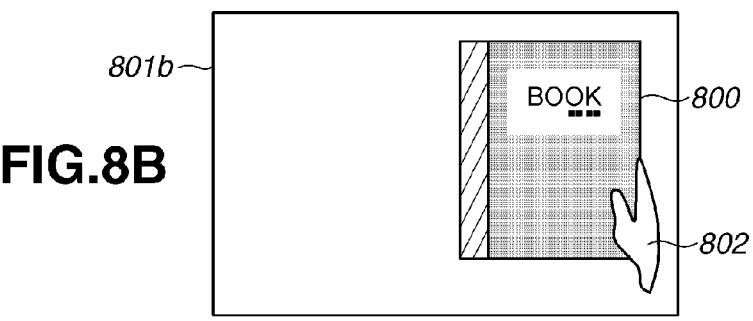

FIG. 8B illustrates a state where the gesture recognition area has been reset because the estimated operation is the "page turning" operation. From the illustration of FIG. 8B, it can be specified that the position of the book (i.e., the target object) gripped by the user's hand 802 is adjacent to the right side of the book and close to the lower side thereof (see step S621). The spine of the book 800 is present on the left side of the target object. Further, a string of characters written on the book is horizontal.

Based on the above-mentioned information, the setting unit 125 determines that the opening direction of the book 800 is the left direction (see step S622). Accordingly, in the page turning operation, there is a higher possibility that the user's hand may greatly move toward a negative side of the x axis. Accordingly, the information processing apparatus resets the recognition area in such a way as to expand greatly in the left direction (i.e., the negative side of the x axis direction) to encompass at least the width of a spread page and have a sufficiently large size in the up-and-down direction (i.e., the y axis direction), as indicated by an area 801b (see step S623).

Figure 8C:
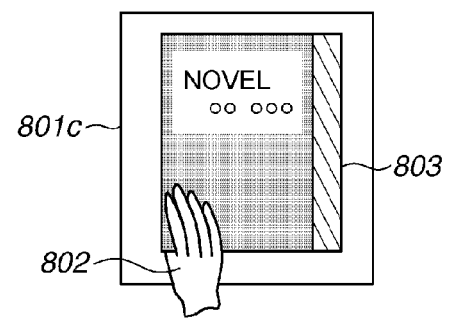
Figure 8D:
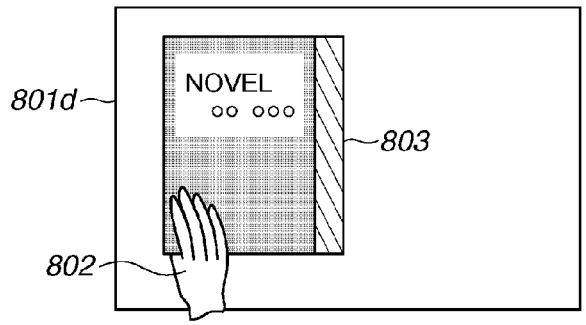

On the other hand, FIG. 8C illustrates a state of a book 803 that has been inserted in the working space. An area 801c is the gesture recognition area that has been set by the setting unit 125 in step S306. FIG. 8C is different from FIG. 8A in that the opening direction of the book 803 is the right direction. Accordingly, the information processing apparatus resets the recognition area in such a way as to expand in the right direction (i.e., the positive side of the x axis direction) to encompass at least the width of a spread page and have a sufficiently large size in the up-and-down direction (i.e., the y axis direction), as indicated by an area 801d in FIG. 8D.

Figure 9A:
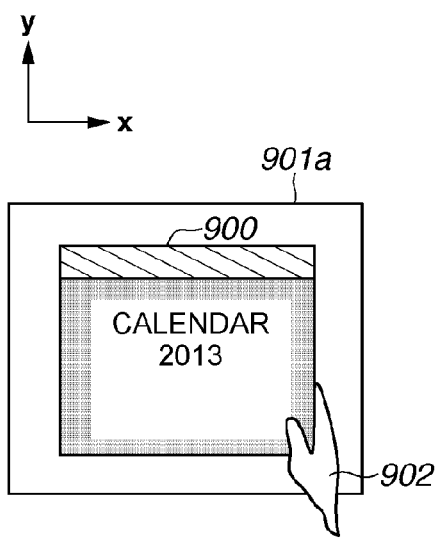
FIGS. 9A to 9D illustrate examples of the recognition area in the case where the "page turning" operation is estimated.

Similarly, FIG. 9A illustrates a state of a book 900 that has been inserted in the working space. An area 901a is the gesture recognition area that has been set by the setting unit 125 in step S306. In the illustration of FIG. 9A, it can be specified that the book 900 can be opened in the upward direction based on the position of the spine and the position of a user's hand 902.

Figure 9B:
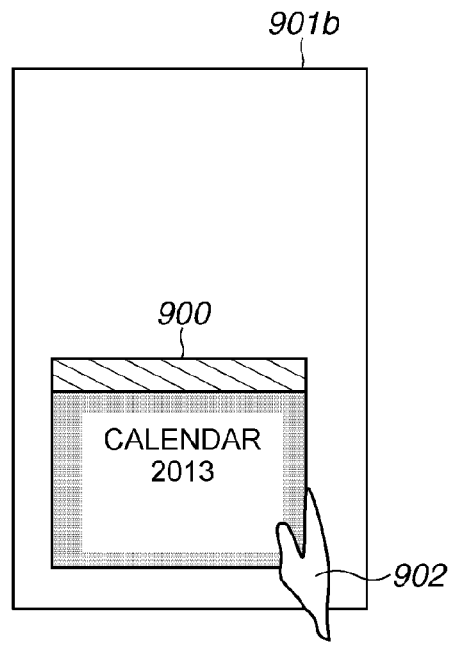

Accordingly, the information processing apparatus resets the recognition area in such a way as to expand in the upward direction (i.e., the positive side of the y axis direction) to encompass at least the width of a spread page and have a sufficiently large size in the right-and-left direction (i.e., the x axis direction), as indicated by an area 901b in FIG. 9B.

Figure 9C:
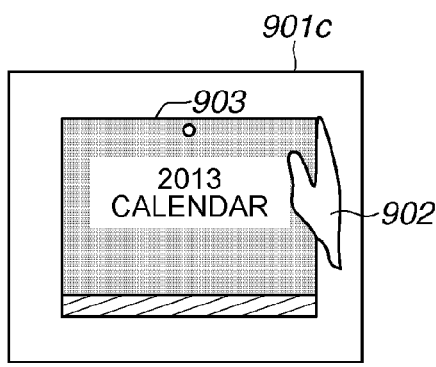
Figure 9D:
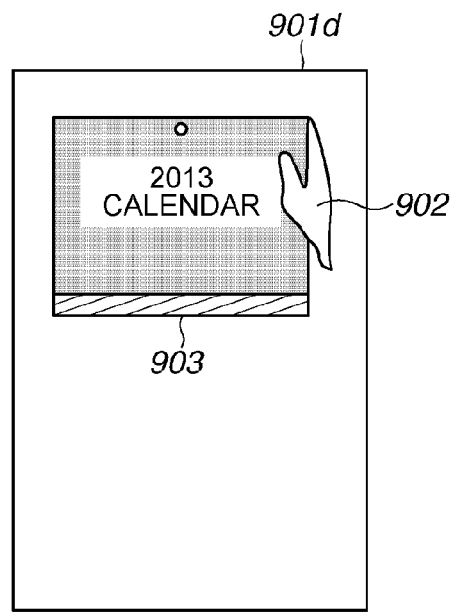

Similarly, FIG. 9C illustrates a state of a book 903 that has been inserted in the working space. An area 901c is the gesture recognition area that has been set by the setting unit 125 in step S306. In the illustration of FIG. 9C, it can be specified that the book 903 can be opened in the downward direction based on the position of the spine and the position of the user's hand 902. Accordingly, the information processing apparatus resets the recognition area in such a way as to expand in the downward direction (i.e., the negative side of the y axis direction) to encompass at least the width of a spread page and have a sufficiently large size in the right-and-left direction (i.e., the x axis direction), as indicated by an area 901d in FIG. 9D.

Figure 10A:
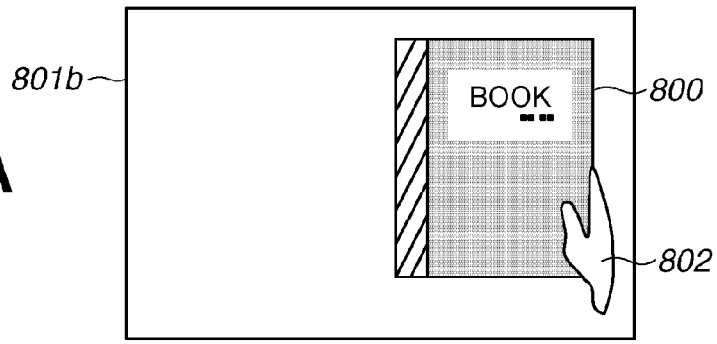
FIGS. 10A, 10B, and 10C illustrate an example of operational states of the "page turning" operation.
Figure 10B:
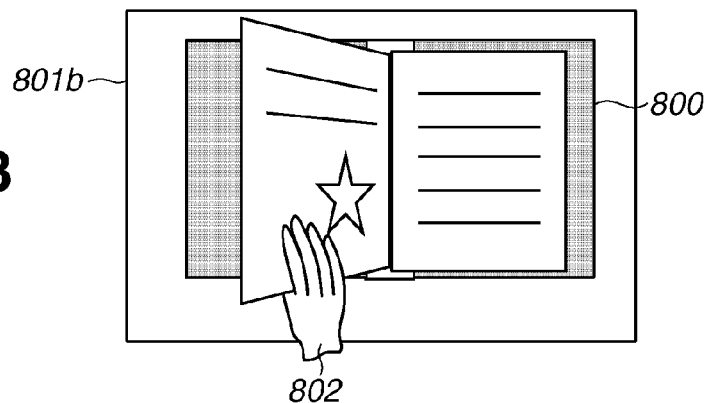
Figure 10C:
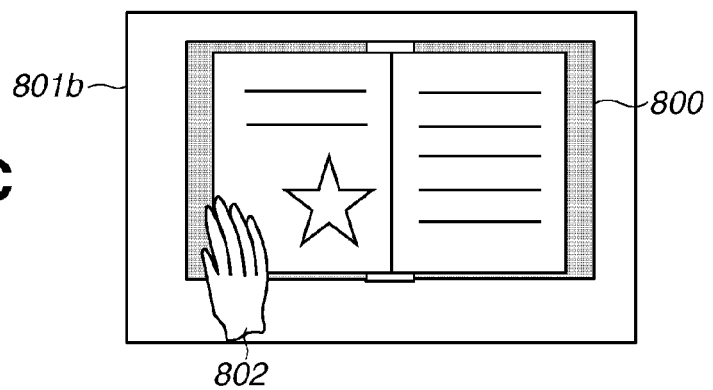

FIGS. 10A, 10B, and 10C illustrate an example of operational states of the "page turning" operation, which have been seen from a point of view positioned above the operation plane. Accordingly, it is presumed that the coordinate system being set in relation to the paper surface includes a y axis extending in the vertical direction and an x axis extending in the horizontal direction.

FIG. 10A is identical to FIG. 8B. The area 801b is the gesture recognition area having been set to recognize a page turning operation if it is performed on the book 800 that opens in the left direction. The information processing apparatus starts detecting the user's hand 802 after completing the setting of the recognition area 801b and chases the movement of a user's gesture operation.

FIG. 10B illustrates a state where the user is actually performing a page turning operation. The hand 802 is positioned in the recognition area 801b. Compared to the state illustrated in FIG. 10A, the hand 802 is positioned on the left side (i.e., in the negative side of the x axis). Further, it is understood that the book 800 is in an opened state because the book 800 stretches in the right-and-left direction and the content thereof is not the same although the book 800 remains in the working space.

FIG. 10C illustrates a stationary state of the hand 802 when the user completes the page turning operation. The recognition unit 126 can recognize that the "page turning" operation has been started by detecting a change of the content on the spread page of the book 800 or by comparing a moving amount of the hand position with a gesture model.

For example, in the present exemplary embodiment, if the user's hand and the target object (i.e., the book) are stationary for a predetermined time during the "page turning" operation, the information processing apparatus repetitively performs reading a newly readable spread page. Then, the information processing apparatus determines that the "page turning" operation has been completed when the user removes the hand 802 from the recognition area 801b (namely, when the hand 802 exits from the area 801b) (see step S313).

As mentioned above, the information processing apparatus according to the present exemplary embodiment can recognize a plurality of types of gesture operations relating to various target objects. In this case, the information processing apparatus can estimate a gesture operation to be performed next based on the target object and peripheral status and can set a gesture recognition area that is suitable for each operation. In other words, it becomes feasible to improve the operability of the gesture operation relating to the target object because the user is not required to perform any exaggerated operation.

In the present exemplary embodiment, user's hand operations, such as "paper moving", "book moving", "dragging", and "image modifying" operations, are preparatory operations prior to the gestures to be performed next. Accordingly, after the resetting of a recognition area is performed in response to a preparatory operation, the information processing apparatus may repeat the processing from step S309 of the flowchart illustrated in FIG. 3 to perform the next gesture operation.

For example, after a user performs a "dragging" operation to move image data, the user may perform a swiping operation to modify the image data to be displayed. In such a case, it is feasible to effectively use the reset recognition area. Further, after a user performs a "paper moving" operation to move a paper, the user may perform a "reversing" operation. In such a case, the information processing apparatus performs recognition area reset processing to set a new recognition area that is suitable for the "reversing" operation in response to a user's motion that grips the paper again.

As mentioned above, in various situations, the information processing apparatus can set an appropriate recognition area that is appropriately applicable to a gesture operation to be performed next. Therefore, each user can easily perform a gesture operation relating to a target object because the user is not required to perform unnaturally exaggerated operation.

In the above-mentioned first exemplary embodiment, the target object is anyone of the paper, the book, and the projected image data. However, the target object is not limited to the above-mentioned examples. For example, the above-mentioned example can be replaced by a three-dimensional object (e.g., a box or a bottle). For example, it is feasible to read a package design on a candy box.

Further, in the first exemplary embodiment, the estimation unit 124 selects a user's gesture operation that will be possibly performed next from a predetermined number of gestures registered beforehand in the dictionary, to estimate an actual gesture operation. However, the processing to be performed by the estimation unit 124 can be replaced by simpler estimation processing.

For example, in the case where the portion gripped by the user's hand is a left edge of the target object, the estimation unit 124 estimates that an operation using the left hand has been performed. In this case, the setting unit 125 can set a partial imaging area that includes a sufficiently wide region extending leftward from the position where the user grips the target object, as a new gesture recognition area.

On the other hand, in the case where the portion gripped by the user's hand is a right edge of the target object, the estimation unit 124 estimates that an operation using the right hand has been performed. In this case, the setting unit 125 can set a partial imaging area that includes a sufficiently wide region extending rightward from the position where the user grips the target object, as a new gesture recognition area.

Further, in the first exemplary embodiment, the information processing apparatus sets a coordinate system that matches the state of a user's arm at the time when the user has inserted the target object (see step S306). Further, when the movement added by the user includes a rotation of the target object, the information processing apparatus can reset the coordinate system based on the direction of the user's arm by performing processing that is similar to the processing in step S306 when the rotation has been completed.

Through the above-mentioned processing, for example, even when the user moves or rotates the target object according to a changed standing position, the information processing apparatus can accurately discriminate and recognize the movement of the user's hand.

Further, in the first exemplary embodiment, only one user performs an operation relating to one target object. However, a plurality of users can perform individual operations on a plurality of target objects. In this case, when the information processing apparatus determines whether the target object has been inserted (see step S303), the information processing apparatus confirms the number of target objects. In the subsequent processing, the information processing apparatus sets a plurality of recognition areas for the confirmed number of the target objects.

Further, in the processing for setting a recognition area that matches the target object and the user position (see step S306), the information processing apparatus confirms the number of users by discriminating the direction of each user's arm and sets a coordinate system for each user. Thus, the information processing apparatus can set an optimum gesture recognition area for each user even in the case where a plurality of users can simultaneously access the apparatus from various directions. Therefore, it becomes feasible to improve the operability in each gesture operation relating to the target object.

Other Embodiments

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-118875 filed Jun. 5, 2013, which is hereby incorporated by reference herein in its entirety.

What is claimed is:

1. An information processing apparatus operable to recognize a gesture operation performed by a gesture object based on an image of a predetermined area captured by an imaging unit the information processing apparatus comprising:
   an acquisition unit configured to acquire positional information about a target object present in the predetermined area;
   a setting unit configured to set a partial area of the predetermined area as a gesture recognition area of at least one gesture operation corresponding to the target object; and
   a recognition unit configured to recognize the gesture operation performed by the gesture object based on a partial portion of the image obtained by the imaging unit, the partial portion corresponding to the gesture recognition area set by the setting unit.

2. The information processing apparatus according to claim 1, further comprising:
   a specifying unit configured to specify a state of the gesture object based on the image,
   wherein the setting unit is configured to set the gesture recognition area based on the positional information about the target object acquired by the acquisition unit and the state of the gesture object having been specified by the specifying unit.

3. The information processing apparatus according to claim 2, further comprising:
   an identification unit configured to identify the target object whose positional information has been acquired by the acquisition unit; and
   an estimation unit configured to estimate a gesture operation to be performed by the gesture object based on the target object identified by the identification unit and the state of the gesture object specified by the specifying unit,
   wherein the setting unit is configured to set the gesture recognition area according to an estimation result obtained by the estimation unit.

4. The information processing apparatus according to claim 1, wherein the setting unit is configured to set a coordinate system that defines the direction of the gesture operation in the gesture recognition area based on the image captured by the imaging unit when the target object whose positional information has been acquired by the acquisition unit is inserted into the predetermined area by the gesture object.

5. The information processing apparatus according to claim 3, wherein the gesture object includes a user's hand and the estimation unit is configured to estimate a gesture operation performed by the user's hand against the target object identified by the identification unit based on the state of the user's hand specified by the specifying unit.

6. The information processing apparatus according to claim 3, wherein the identification unit is configured to identify that the target object includes a paper or a book.

7. The information processing apparatus according to claim 6, wherein when the identification unit identifies that the target object is a paper and the specifying unit specifies that the user's hand is gripping the target object detected by a detection unit, the estimation unit estimates that the user's hand will perform a gesture operation to reverse the paper, and
   the setting unit is configured to reset the gesture recognition area in such a way as to include a range in which the user's hand will possibly move when the user's hand reverses the paper.

8. The information processing apparatus according to claim 6, wherein when the identification unit identifies that the target object is a book and the specifying unit specifies that the user's hand is gripping the target object detected by a detection unit, the estimation unit estimates that the user's hand will perform a gesture operation to turn a page of the book, and
   the setting unit is configured to reset the gesture recognition area in such a way as to include a range in which the user's hand will possibly move when the user's hand turns the page of the book.

9. The information processing apparatus according to claim 1, wherein the target object includes a virtual object displayed in the predetermined space, which can be displayed by a display unit, and a physical object inserted in the predetermined space.

10. The information processing apparatus according to claim 9, wherein when the identification unit identifies the target object detected by a detection unit as the virtual target object displayed by the display unit in the predetermined space, the recognition unit recognizes a swiping operation in which the gesture object changes the virtual target object to be displayed in the predetermined space, according to a traversing movement crossing an area, which has been set around the target object by the setting unit, of the display unit.

11. A method for controlling an information processing apparatus operable to recognize a gesture operation performed by a gesture object based on an image of a predetermined area captured by an imaging unit, the control method comprising:

acquiring positional information about a target object present in the predetermined area;

setting a partial area of the predetermined area, the partial area corresponding to the acquired positional information about the target object as a gesture recognition area of at least one gesture operation corresponding to the target object; and recognizing the gesture operation performed by the gesture object based on a partial portion of the image captured by the imaging unit, the partial portion corresponding to the set gesture recognition area.

12. The information processing apparatus control method according to claim 11, further comprising:

specifying a state of the gesture object based on the image, wherein the setting includes an operation to set the gesture recognition area based on the acquired positional information about the target object and the specified state of the gesture object.

13. The information processing apparatus control method according to claim 12, further comprising:

identifying the acquired target object; and estimating a gesture operation to be performed by the gesture object based on the identified target object and the specified state of the gesture object, wherein the setting includes an operation to set the gesture recognition area according to an estimated result.

14. A computer readable storage medium that stores a program that causes a computer to function as each unit of the information processing apparatus according to claim 1.

* * * * *